United States Patent
Faulkner et al.

(10) Patent No.: US 9,924,136 B1
(45) Date of Patent: Mar. 20, 2018

(54) COORDINATED DISPLAY TRANSITIONS OF PEOPLE AND CONTENT

(71) Applicant: MICROSOFT TECHNOLOGY LICENSING, LLC, Redmond, WA (US)

(72) Inventors: Jason Thomas Faulkner, Seattle, WA (US); Casey Baker, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/420,042

(22) Filed: Jan. 30, 2017

(51) Int. Cl.
H04N 7/15 (2006.01)
G09G 5/14 (2006.01)
G06T 13/80 (2011.01)

(52) U.S. Cl.
CPC .............. *H04N 7/15* (2013.01); *G06T 13/80* (2013.01); *G09G 5/14* (2013.01); *G09G 2340/0464* (2013.01); *G09G 2354/00* (2013.01)

(58) Field of Classification Search
None
See application file for complete search history.

(56) References Cited

U.S. PATENT DOCUMENTS

| | | |
|---|---|---|
| 9,082,106 B2 | 7/2015 | Jones et al. |
| 2011/0271211 A1 | 11/2011 | Jones et al. |
| 2012/0166545 A1 | 6/2012 | Alexandrov et al. |
| 2013/0169742 A1 | 7/2013 | Wu et al. |
| 2013/0242030 A1 | 9/2013 | Kato et al. |
| 2014/0160224 A1 | 6/2014 | Herger et al. |
| 2015/0200982 A1 | 7/2015 | Velagaleti et al. |
| 2015/0304607 A1 | 10/2015 | Bader-natal et al. |
| 2016/0308920 A1 | 10/2016 | Brunsch et al. |
| 2016/0334973 A1* | 11/2016 | Reckhow ............... G06T 13/80 |
| 2017/0017616 A1* | 1/2017 | Elings .................. G06F 17/212 |
| 2017/0054663 A1* | 2/2017 | Geiger ................... H04L 51/10 |

OTHER PUBLICATIONS

"RingCentral Meetings: User Guide", http://web.archive.org/web/20150815000000*/https:/netstorage.ringcentral.com/guides/meetings_user_guide.pdf, Published on: Sep. 8, 2015, pp. 1-41.

(Continued)

*Primary Examiner* — Creighton Smith
(74) *Attorney, Agent, or Firm* — Newport IP, LLC; Scott Y. Shigeta

(57) ABSTRACT

The techniques disclosed herein provide coordinated display transitions of renderings of content and people that are moved between display areas of a user interface to bring emphasis to salient activity of a teleconference session. For example, as renderings of people or content shift from one section of a UI to another, the movement is performed in a guiding manner that enables participants of a teleconference session to follow the relevant action of a session. The movement is also performed in a manner that is natural, fluid, and delightful to users. The coordination of moving elements may emphasize the movement of a first rendering of people or content and deemphasize other types of activity. In addition, one or more graphical displays can involve the use of an easing curve and parallax animation techniques to emphasize or deemphasize select renderings of people or content.

15 Claims, 38 Drawing Sheets

(56) References Cited

OTHER PUBLICATIONS

Lafave, Nick, "An Easy Online Meeting Scheduler—Find Times That Work for Everyone", http://edtechpicks.org/2015/10/an-easy-online-meeting-scheduler-find-times-that-work-for-everyone/, Published on: Oct. 6, 2015, 8 pages.
"GoToMeeting", https://www.gotomeeting.com/features, Published on: Oct. 16, 2015, 7 pages.
"Engage on a More Personal Level", https://www.anymeeting.com/web-conferencing/video-conferencing/, Published on: Sep. 30, 2016, 5 pages.
"Change Presenter on the fly of Meeting", https://www.zoho.com/meeting/switch-presenter.html, Published on: Sep. 7, 2015, 3 pages.

\* cited by examiner

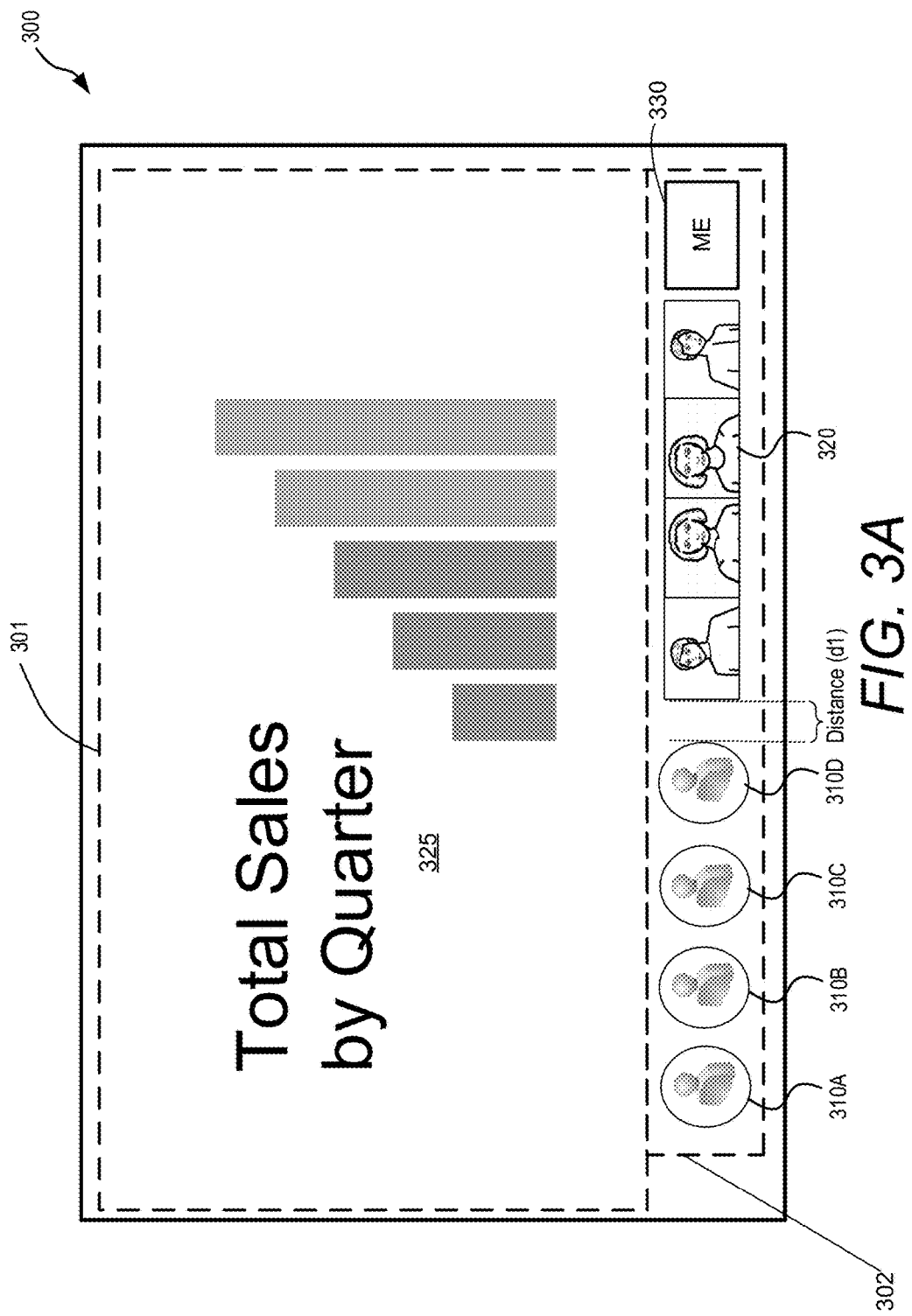

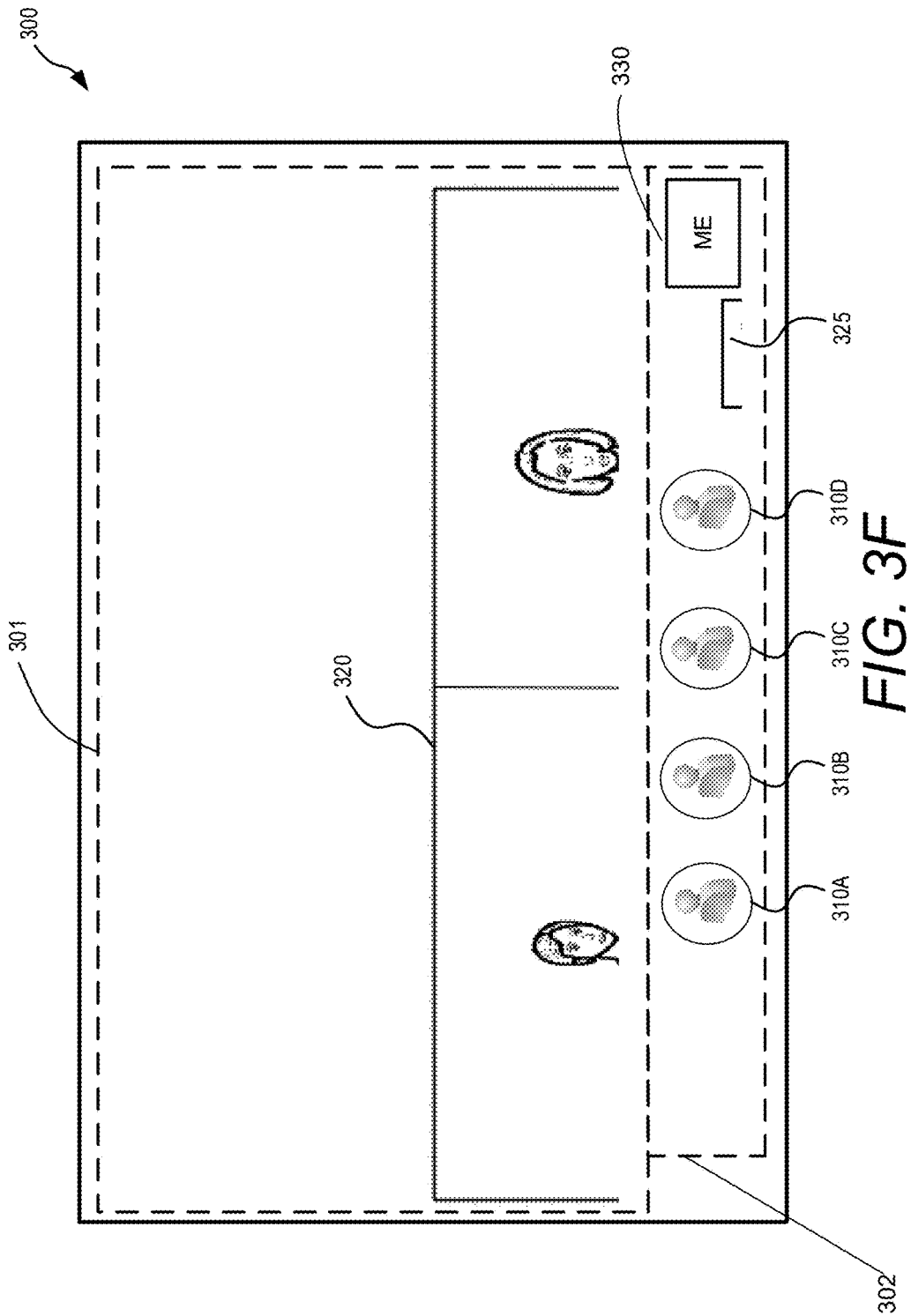

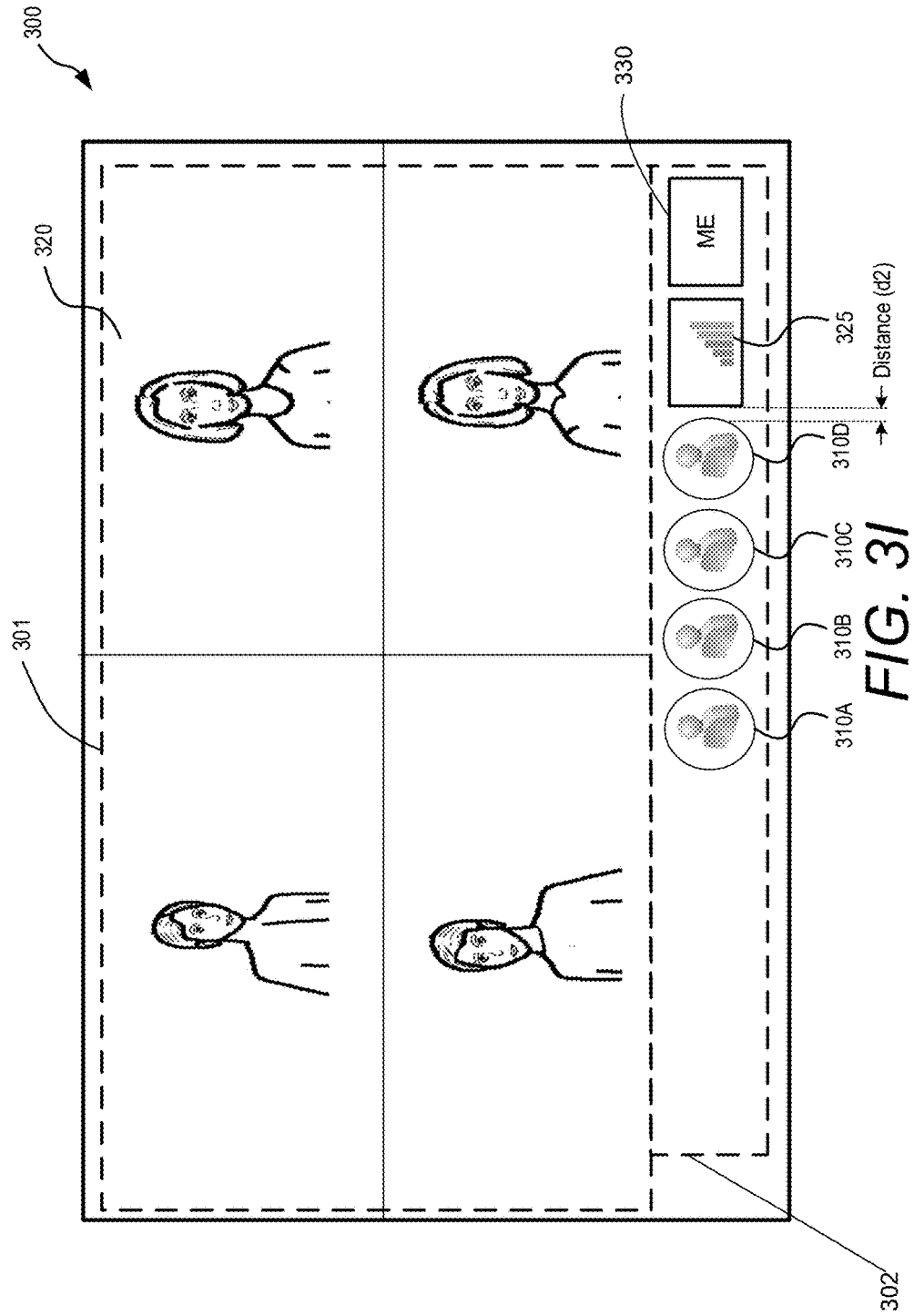

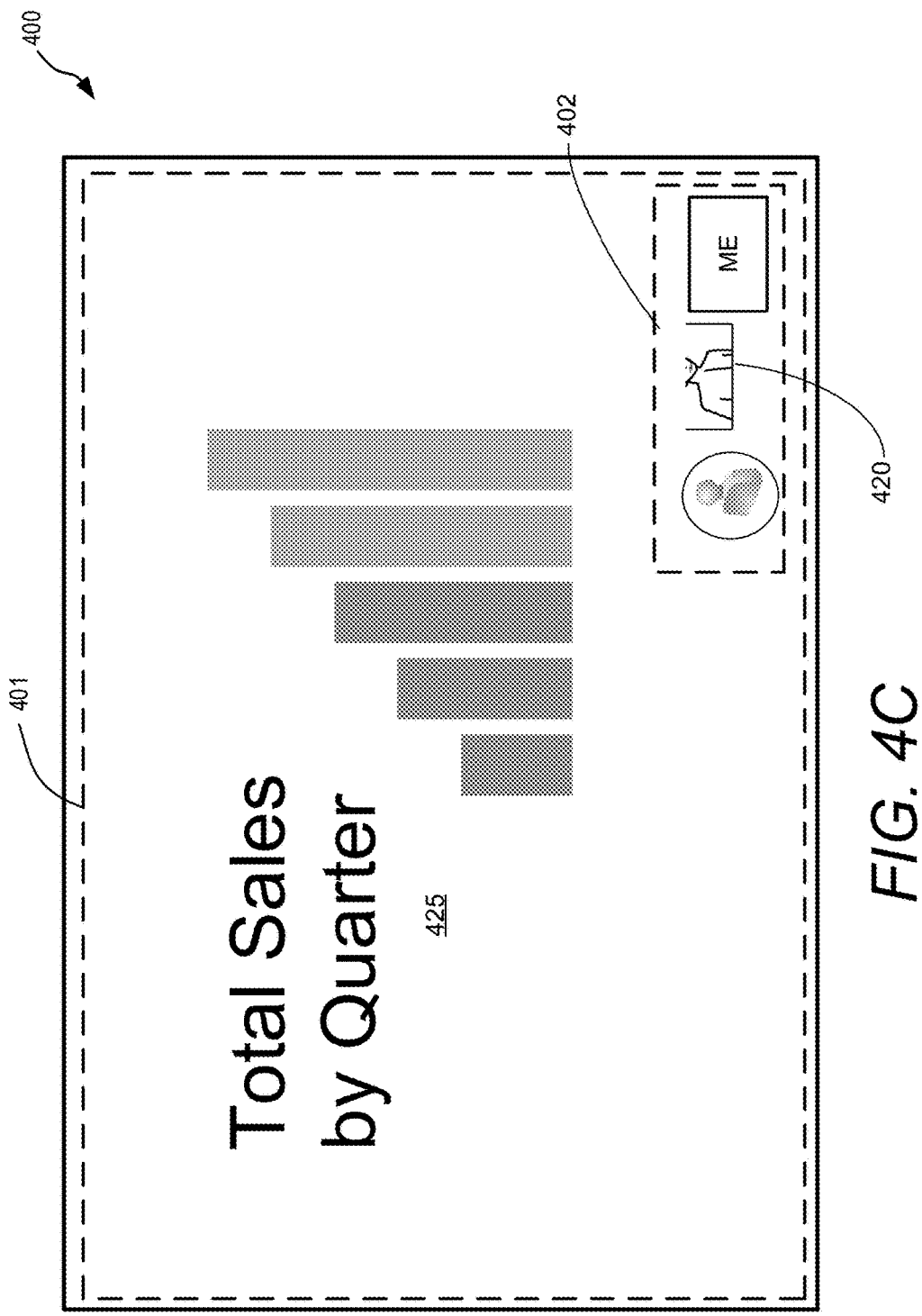

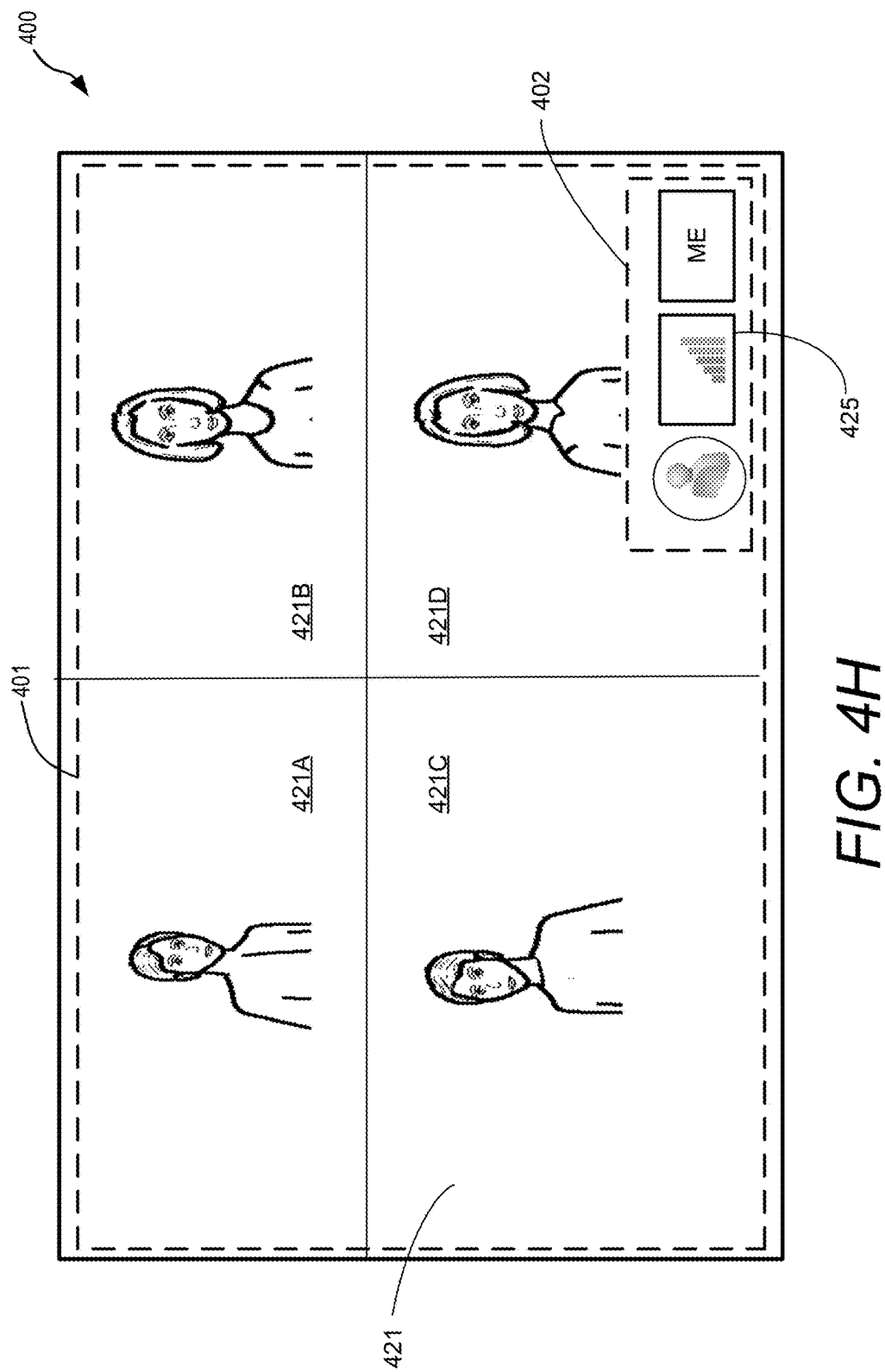

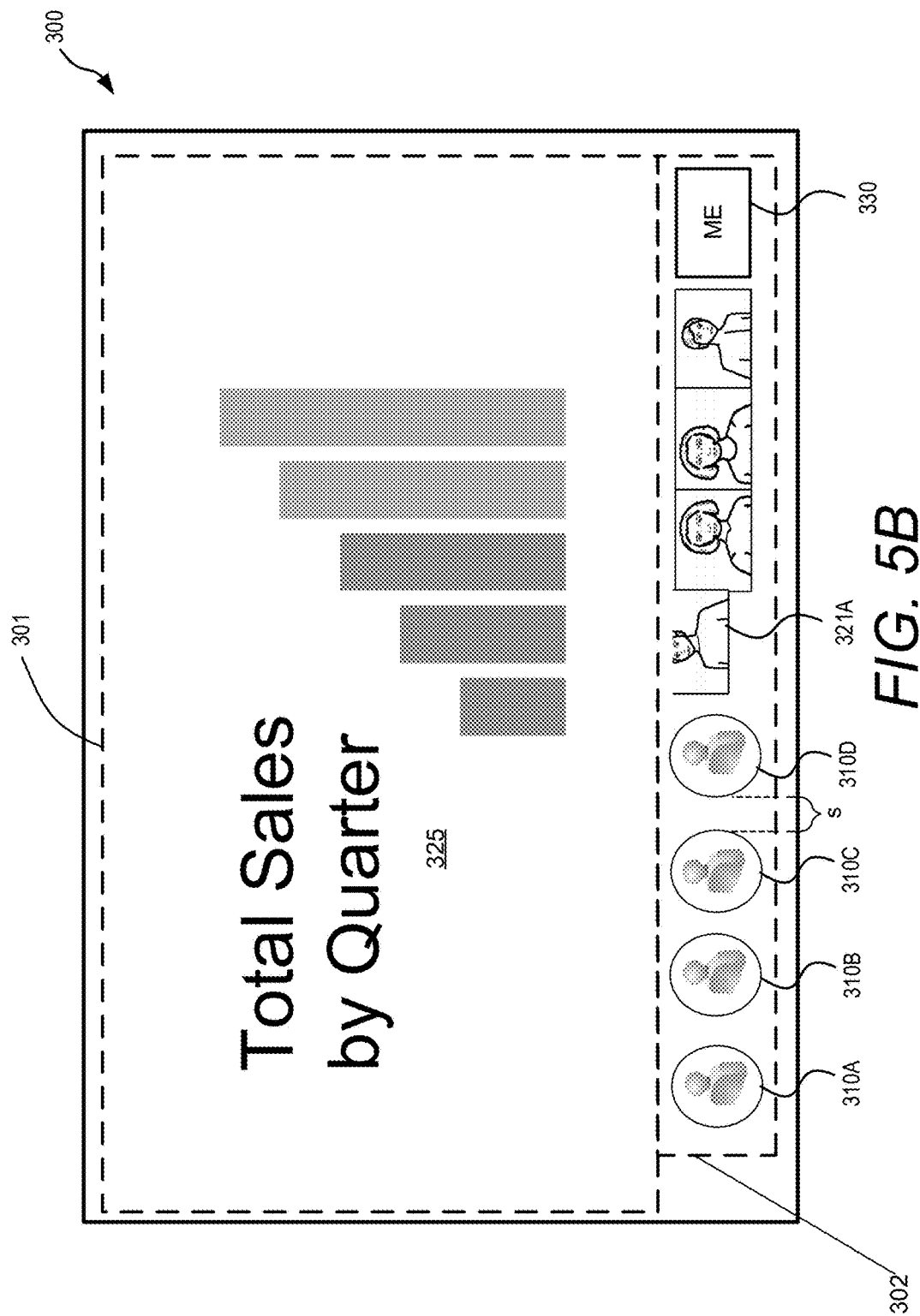

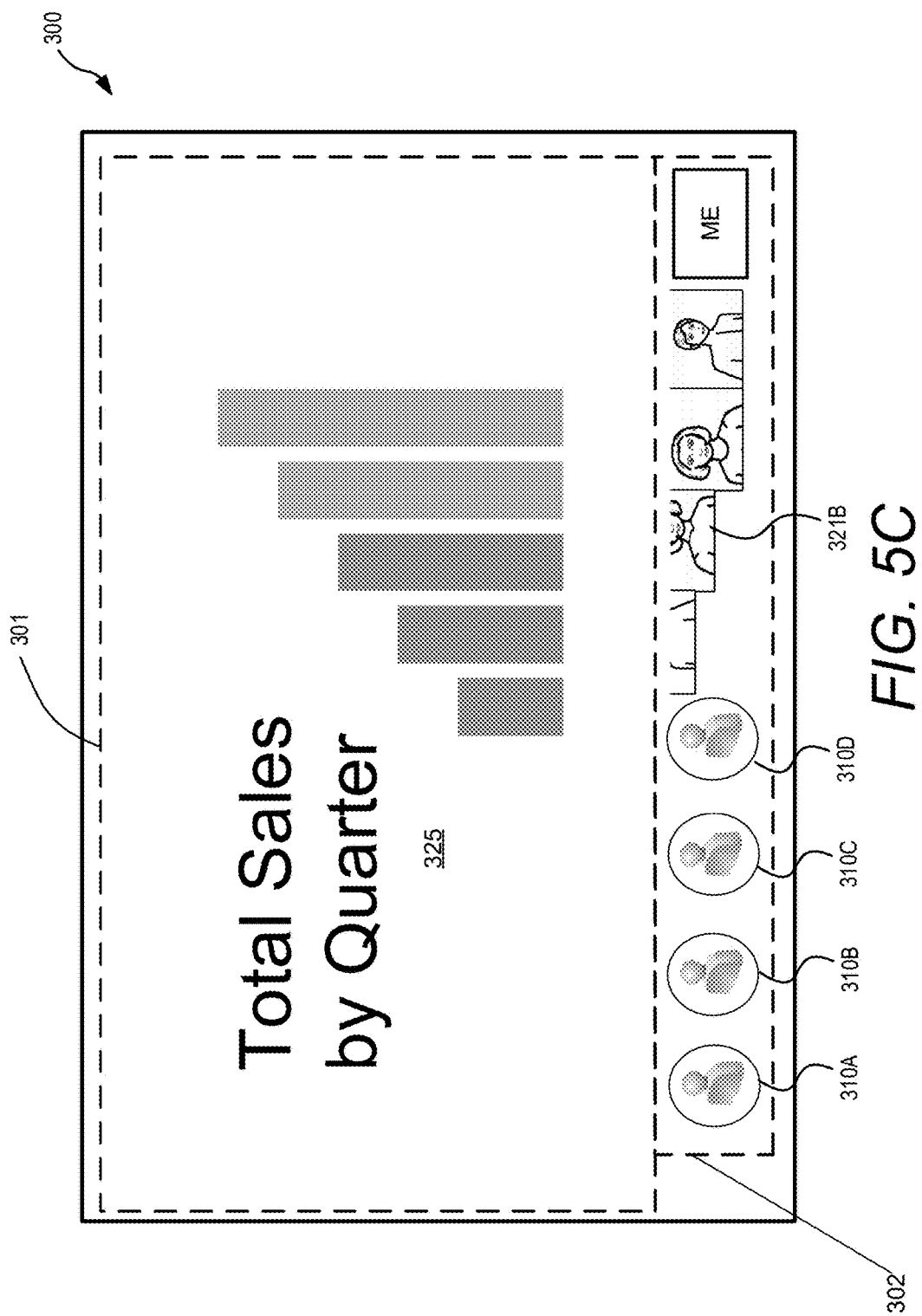

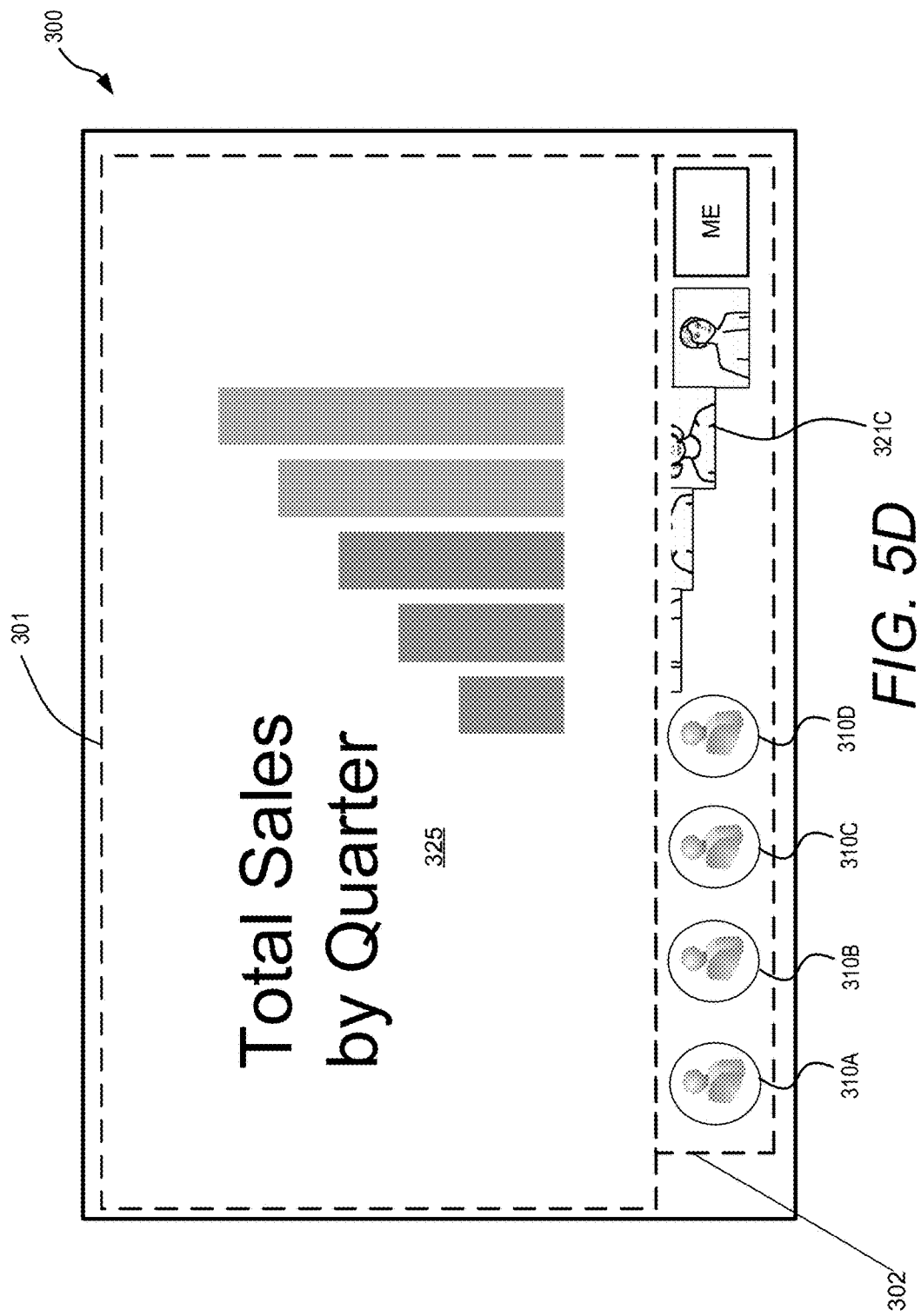

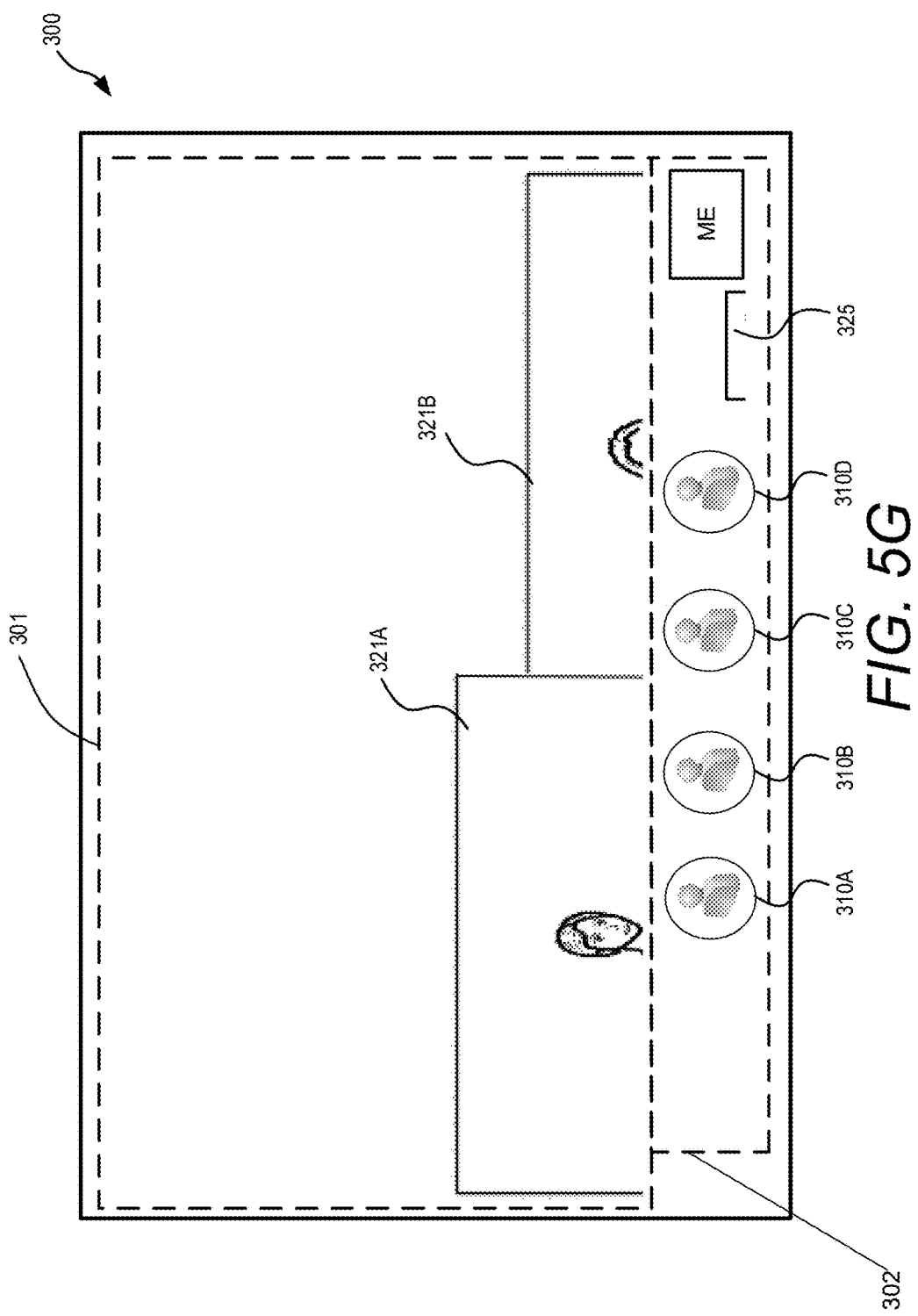

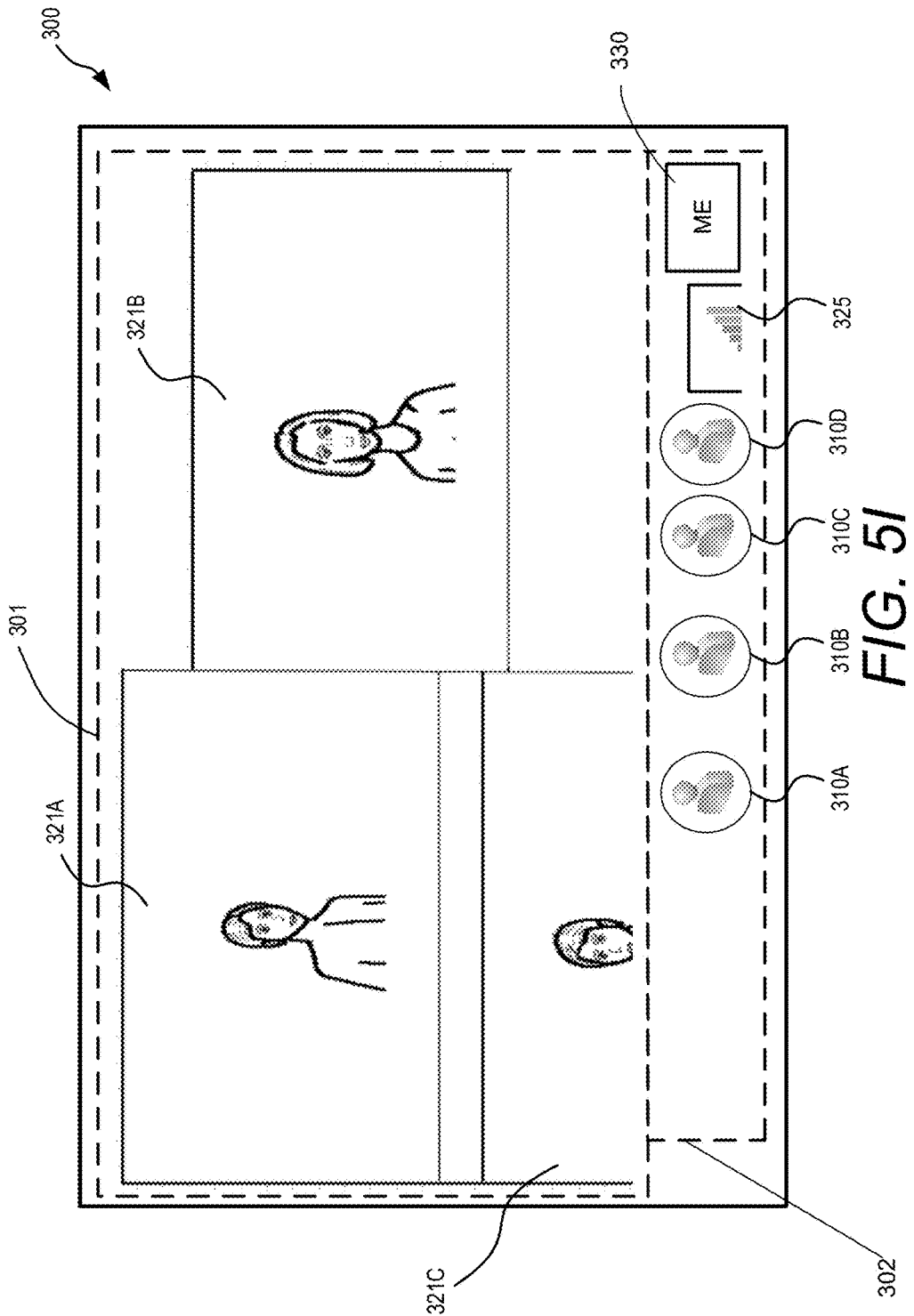

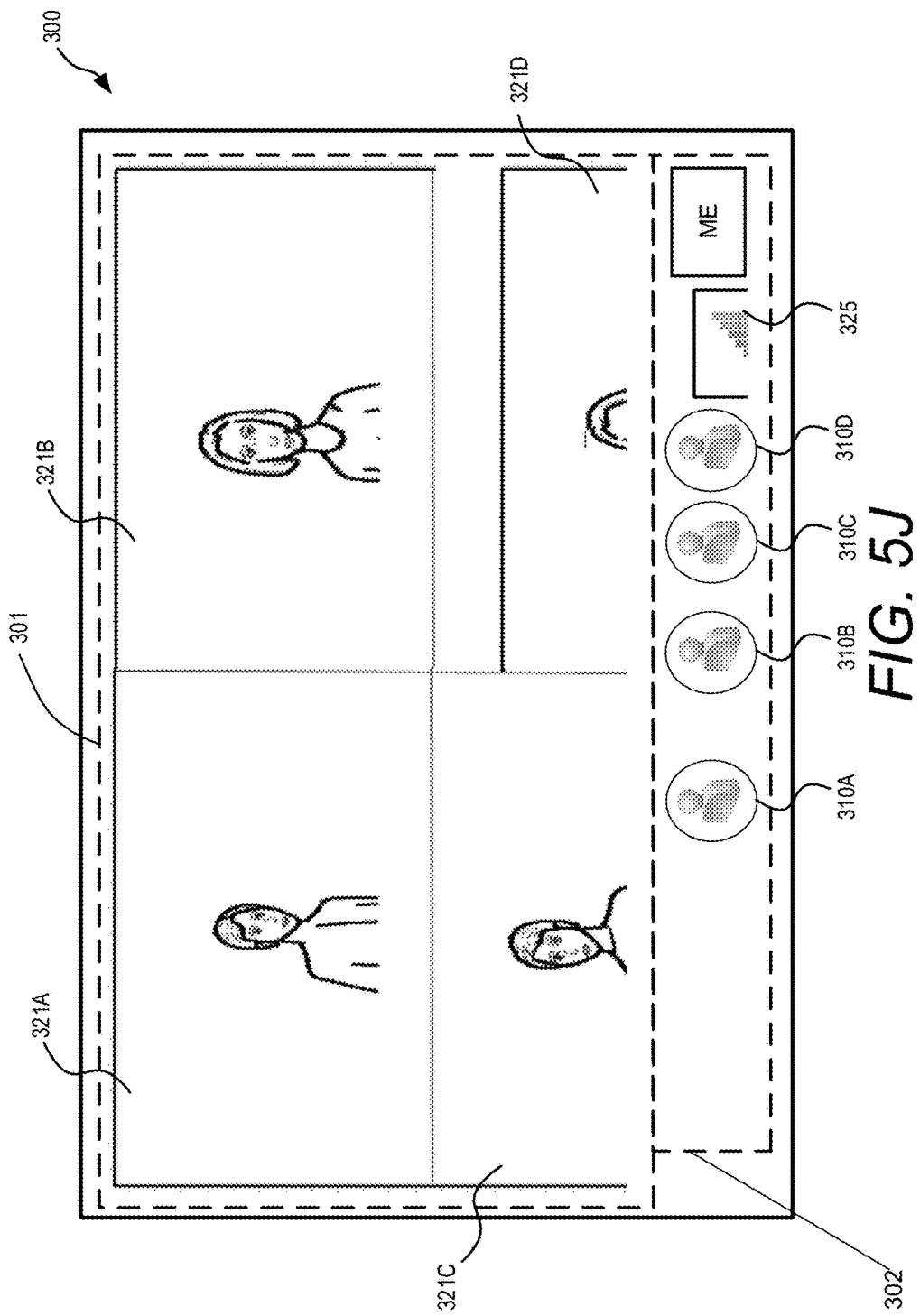

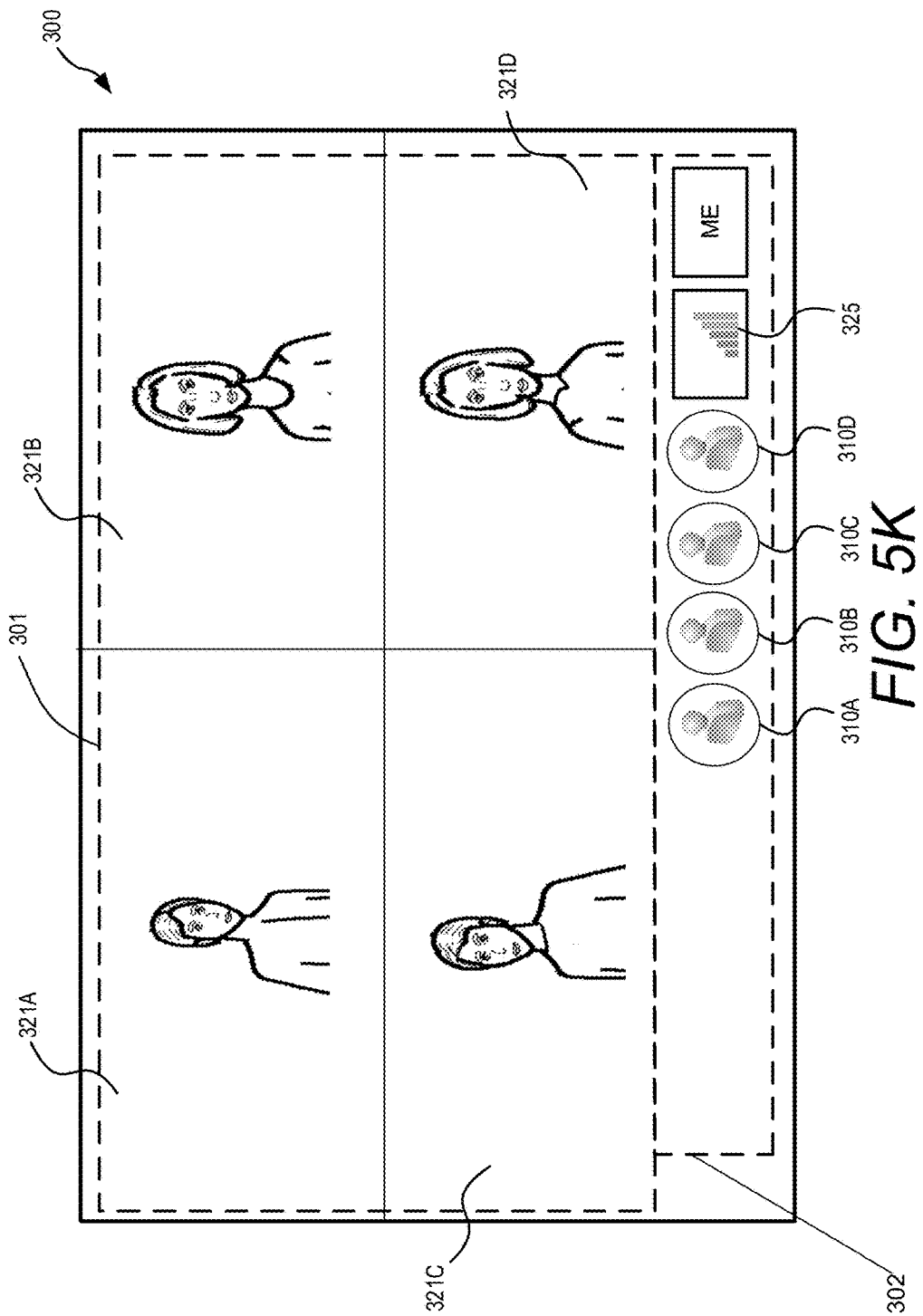

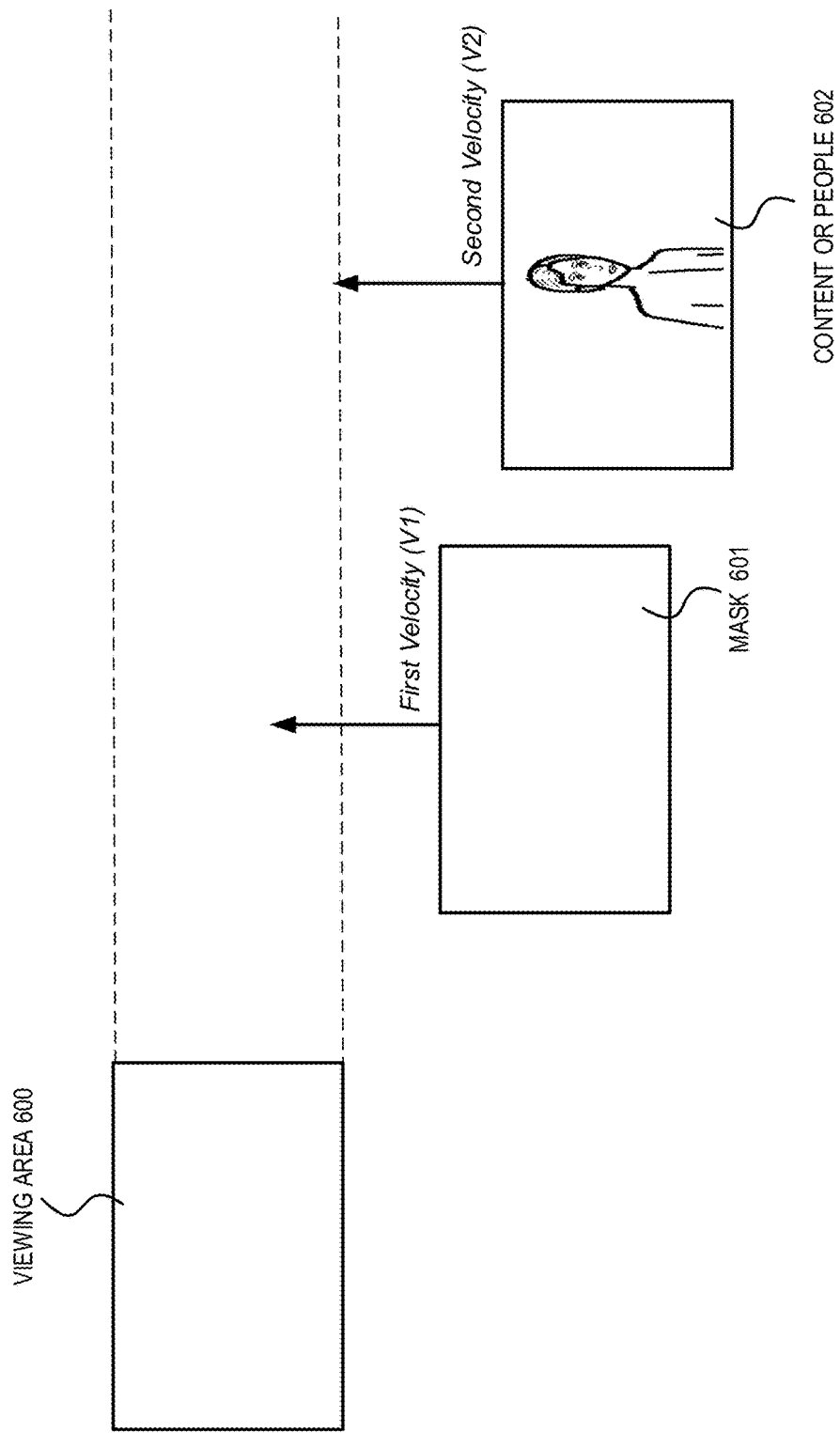

COORDINATED DISPLAY TRANSITIONS OF PEOPLE AND CONTENT

BACKGROUND

The use of teleconference systems in commercial and corporate settings has increased in facilitating meetings and conferences between people in remote locations, reducing the need for travel so as to bring these people physically together in order to conduct the meetings or conferences. In general, teleconference systems allow users (i.e., people) of a teleconference system, in two or more remote locations, to communicate interactively with each other via live, simultaneous two-way video streams, audio streams, or both. Some teleconference systems (such as, for example, Cisco WebEx provided by Cisco Systems, Inc. of San Jose, Calif., GoToMeeting provided by Citrix Systems, Inc. of Santa Clara, Calif., Zoom provided by Zoom Video Communications of San Jose, Calif., Google Hangouts by Alphabet Inc. of Mountain View, Calif., and Skype provided by Microsoft Corporation, of Redmond, Wash.) also allow users to exchange digital documents such as, for example, images, text, video and any others.

A limitation of some teleconference systems is that they do not allow users to experience the typical interactions that occur at live meetings when all the users are physically present at the same location. Most teleconference systems utilize remote communication devices (such as, for example, video terminals, personal computers (both desktop and portable) and mobile devices such as, for example, tablets, smartphones, etc.) that display video and play audio from the meeting, or conference, on a video display that may vary in size based on the type of communication devices or video display. As a result, the remote users of the teleconference system are typically limited to viewing the interactions of the meeting, or conference, through a "window" of the meeting, or conference, produced by the video display, which may be the screen of a mobile device, computer monitor, or large video display.

This results in a user interface that produces a fixed experience for the remote users of the teleconference system attending the meeting or conference. Generally, this user interface only allows users to see framed individuals (i.e., images of other people participating in a meeting) in a gallery experience with a lot of negative space in the user interface that is not engaging for the remote users.

Additionally, the remote users are simply monitoring camera images from fixed positions which may be located either at the location of the physical meeting, or conference, or at the location(s) of other remote users attending the meeting, or conference. Moreover, in some teleconference systems, some remote users may see multiple displays of fixed streams of video data on their video displays with very few options for allowing individual remote users to customize their views to see important or salient activity of a teleconference session.

Some systems may allow for reconfiguration of the layout of the user interface during a teleconference session. For example, one display area of a user interface may display a video stream of a user and another display area of the user interface may display a rendering of a document. One or more actions may cause the layout to change. As the layout changes, the content of one display area may be moved to another display area. When content moves from one area of a UI to another area, it can be hard for users to follow the movement. Such deficiencies of existing teleconference systems make it hard for users to decipher the intent of such movements. Such systems typically can cause the user to become unengaged or confused, which can lead to production loss and other inefficiencies.

As such, there is a need for an improved teleconference system that addresses these and other issues.

SUMMARY

The techniques disclosed herein provide coordinated display transitions of people and content. When a rendering of a video stream is moved between different display areas of a user interface (UI), coordinated animations can emphasize or deemphasize select activity that is displayed. For example, as renderings of people or content shift from one display area of a UI to another display area, the movement is performed in a guiding manner that enables participants of a teleconference session to follow the relevant action. The movement is also performed in a manner that is natural, fluid, and delightful to users. The coordination of moving elements may also deemphasize certain types of activity. In addition, one or more graphical displays can involve the use of an easing curve and parallax animation techniques to emphasize or deemphasize select renderings of people or content.

As will be described in more detail below, the techniques disclosed herein provide a storied stage environment by the use of motion that involves a transition behavior that guides and informs users of a particular activity. The motion provides recognizable, signature transitions that build identifiable experiences. The motion also enhances the user experience promoting deeper participant engagement in important activity or potentially important activities.

In some configurations, a teleconference system can cause streams of shared video and images to be displayed in a UI having a first display area and a second display area. The first display area can include a rendering of a first stream of a teleconference session. For example, the first stream can include an image of a document displayed in the first display area of the UI. The second display area can include a rendering of a second stream of the teleconference session. For example, the second stream can include video or images of one or more participants or other content that is selected based on a level of activity of the participants or other content. In such an example, participants or other content having a threshold level of activity, e.g., the salient activity of a session, can be displayed in the second display area of the UI. The second display area can be, for example, an area displaying a number of thumbnails individually displaying the participants or other content.

The system can receive a control command for causing a transition of the UI. The control command, for example, can be invoked by a computer or invoked by a user. In response to receiving the control command, the system can cause the rendering of a stream to transition from one display area of a UI to another display area of the UI. With reference to the above example, in response to receiving the control command, the display of the video or images of the participants or other content, e.g., the rendering of the second stream, can transition from the second display area to the first display area.

The transition of the UI can involve several coordinated animated movements to enable users to follow the movement of people or content from one area of the UI to another area. For instance, in response to receiving the control command, the rendering of the second stream within the second display area can begin to move toward the first display area. In some configurations, the movement of the rendering of the second stream within the second display area can involve an animation where the rendering of the second stream appears to slide toward the first display area.

In association with the movement of the rendering of the second stream within the second display area, the system can also display a rendering of the second stream in the first display area. With reference to the above example, the display of the video or images of the participants or other content, e.g., the rendering of the second stream, can appear on the first display area. The rendering of the second stream within the first display area can also involve an animated movement, where the rendering of the second stream within the first display area moves from a first position to a final position within the first display area. In some configurations, the movement of the rendering of the second stream within the first display area can involve an animation where the rendering of the second stream appears to slide away from the second display area toward the final position in the first display area.

The movement of the rendering of the second stream within the second display area and the movement of the rendering of the second stream within the first display area are coordinated to bring focus to the depicted activity as a rendering of the session moves from one display area of the UI to another. Thus, the display of a stream can move from one display area to another display area in a coordinated manner allowing a user to follow the movement and focus on any particular activity, which may include salient activity of a session.

For illustrative purposes, the movement of the rendering of the second stream within the second display area is referred to as a "throw," and the movement of the rendering of the second stream within the first display area is referred to as a "catch." Coordination between the throw and the catch movements enables users to track the movement of important activity that is transitioning from one display area to another display area. In some configurations, the velocity of the throwing motion and the velocity of the catching motion can be configured to bring focus to the movement or salient activity. For example, the velocity of the throwing motion and the catching motion can be a constant value. In another example, the velocity of the of the throwing motion and the catching motion can be based on an easing curve. As will be described in more detail below, an easing curve involves an exponential increase in the velocity of the throwing motion, and an exponential decrease in the velocity of the catching motion.

Other features described in more detail below deemphasize the movement of other activity. By bringing focus to some transitions and deemphasizing other transitions, the user experience is enhanced, which promotes a deeper participant engagement in important activity or potential activities.

As will be described in more detail below, aspects of the present disclosure can involve the use of a parallax animation. In some configurations, a parallax animation can bring focus to renderings of one or more streams of the teleconference data as the renderings are moved from one section of a UI to another. The parallax animation brings focus to the movement of salient activity thus enhancing the user experience and promoting deeper participant engagement.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

FIGS. 3A-3I are screenshot views of a display corresponding to one of the client computing devices in the teleconference session illustrating a transition of content or people in a persistent view.

FIGS. 4A-4H are screenshot views of a display corresponding to one of the client computing devices in the teleconference session illustrating a transition of content or people in an overlay view.

FIGS. 5A-5K are screenshot views of a display corresponding to one of the client computing devices in the teleconference session illustrating a transition of content or people in a persistent view.

FIG. 6A-6F are screenshot views of renderings of one or more streams that can be displayed using parallax animation to bring focus to select activity of a teleconference session.

DETAILED DESCRIPTION

Figure 1:
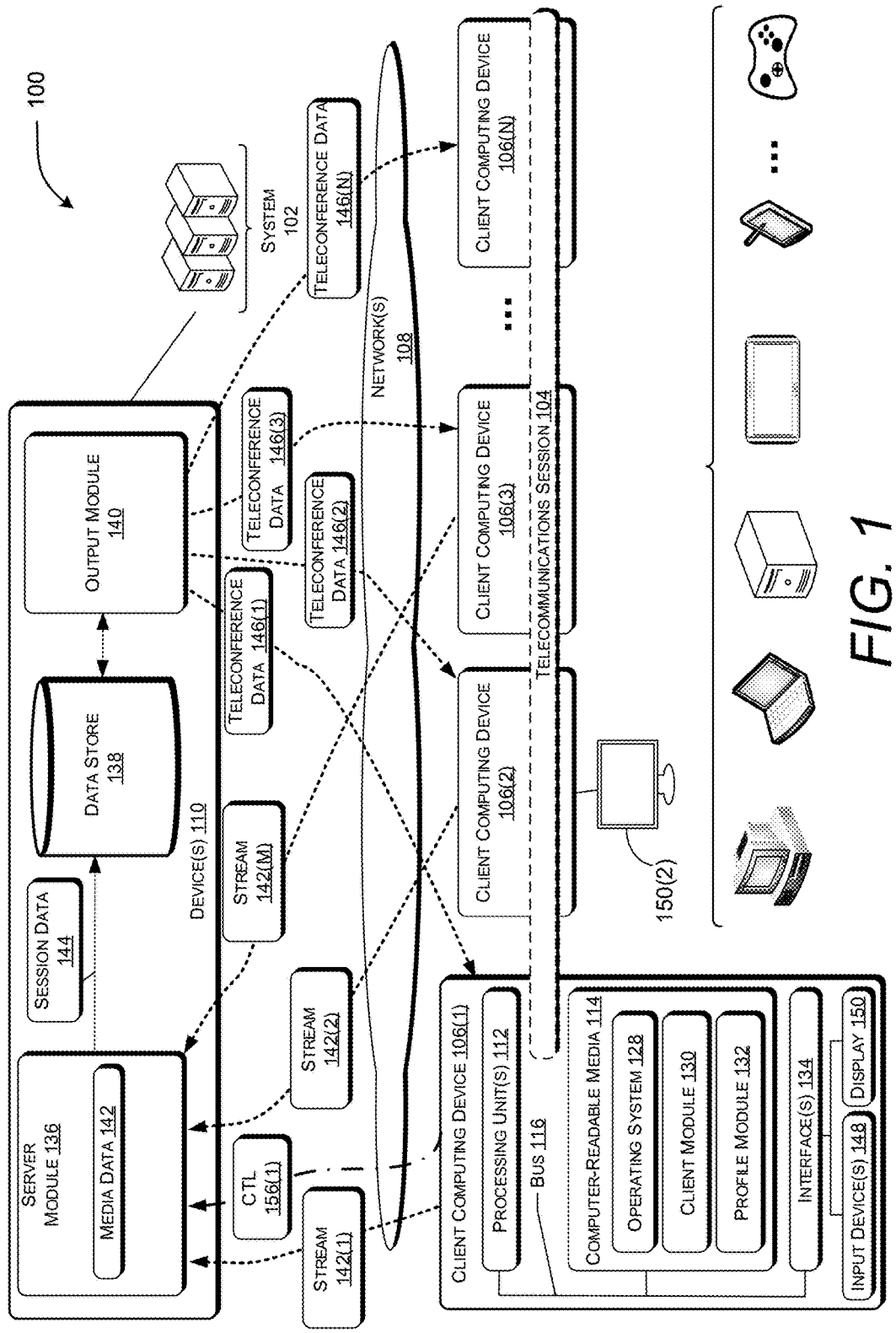
FIG. 1 is a block diagram of an example of a teleconference system.

The following Detailed Description describes technologies enabling coordinated display transitions of people and content in teleconference sessions. In some embodiments, the techniques disclosed herein provide coordinated display transitions of renderings of content and people that are moved between display areas of a user interface (UI) to bring emphasis to salient activity of a teleconference session. For example, as renderings of people or content shift from one section of a UI to another, the movement is performed in a guiding manner that enables participants of a teleconference session to follow the relevant action of a session. The movement is also performed in a manner that is natural, fluid, and delightful to users. The coordination of moving elements may also deemphasize certain types of activity. In addition, one or more graphical displays can involve the use of an easing curve and parallax animation techniques to emphasize or deemphasize select renderings of people or content.

As will be described in more detail below, the techniques disclosed herein provide a storied stage environment by the use of motion that involves a transition behavior that guides and informs users of a particular activity. The motion provides recognizable, signature transitions that build identifiable experiences. The motion also enhances the user experience promoting deeper participant engagement in important activity or potential activities.

In some configurations, a system can cause streams of shared video and images to be displayed in a UI having a first display area and a second display area. In some configurations, the first display area can be larger than the second display area. The first display area can include a rendering of a first stream of a teleconference session. For example, the first stream of the teleconference data can include an image of a document displayed in the first, e.g., a primary, display area of the UI. The second display area can include a rendering of a second stream of the teleconference session. For example, the second stream of the teleconference data can include video or images of one or more participants or other content that is selected based on a level of activity of the participants or other content. In such an example, participants or other content having a threshold level of activity, e.g., the salient activity of a session, can be displayed in the second display area of the UI. The second display area can be, for example, an area displaying a number of thumbnails.

The system can receive a control command for causing a transition of the UI. The control command, for example, can be invoked by a computer or invoked by a user. In response to receiving the control command, the system can cause the rendering of a stream to transition from one display area of a UI to another display area of the UI. With reference to the above example, in response to receiving the control command, the display of the video or images of the participants or other content, e.g., the rendering of the second stream, can transition from the second display area to the first display area.

The transition of the UI can involve several coordinated animated movements to enable users to track the movement of people or content from one area of the UI to another. For instance, in response to receiving the control command, the rendering of the second stream within the second display area can begin to move toward the first display area. In some configurations, the movement of the rendering of the second stream within the second display area can involve an animation where the rendering of the second stream appears to slide toward the first display area.

In association with the movement of the rendering of the second stream within the second display area, the system can also display a rendering of the second stream in the first display area. With reference to the above example, the display of the video or images of the participants or other content, e.g., the rendering of the second stream, can appear on the first display area.

The rendering of the second stream in the first display area can also involve an animated movement, where the rendering of the second stream within the first display area moves from a first position to a final position within the first display area. In some configurations, the movement of the rendering of the second stream within the first display area can involve an animation where the rendering of the second stream appears to slide away from the second display area toward the final position.

The movement of the display of the second stream within the second display area and the movement of the display of the second stream within the first display area are coordinated to bring focus to the salient activity as a rendering of the salient activity moves from one section of the UI to another. Thus, the display of a stream can move from one display area to another display area in a coordinated manner allowing a user to follow the movement and focus on the salient activity.

For illustrative purposes, the movement of the rendering of the second stream within the second display area is referred to as a "throw," and the movement of the rendering of the second stream within the first display area is referred to as a "catch." Coordination between the throw and the catch movements enables users to track the movement of people or content. In some configurations, the velocity of the throwing motion and the velocity of the catching motion can be configured to bring focus to the movement or salient activity. For example, the velocity of the throwing motion and the catching motion can be a constant value. In another example, the velocity of the of the throwing motion and the catching motion can be based on an easing curve. As will be described in more detail below, an easing curve involves an exponential increase in the velocity of the throwing motion, and an exponential decrease of the velocity of the catching motion.

Other features described in more detail below deemphasize the movement of other activity. By bringing focus to some transitions and deemphasizing other transitions, the user experience is enhanced, which promotes a deeper user engagement in important activity or potential activities.

As will be described in more detail below, aspects of the present disclosure can involve the use of a parallax animation. In some configurations, a parallax animation can bring focus to renderings of one or more streams of the teleconference data as the renderings are moved from one section of a UI to another. The parallax animation brings focus to the movement of salient activity thus enhancing the user experience and promoting deeper user engagement. For illustrative purposes, the term "user" and "participant" are used interchangeably and in some scenarios the terms have the same meaning. In some scenarios, a user is associated with and interacting with a computer. A participant, for example, can be a user of a computer viewing and providing input to a teleconference session.

In FIG. 1, a diagram illustrating an example of a teleconference system 100 is shown in which a system 102 can control the display of a teleconference session 104 in accordance with an example implementation. In this example, the teleconference session 104 is between a number of client computing devices 106(1) through 106(N) (where N is a positive integer number having a value of two or greater). The client computing devices 106(1) through 106(N) enable users to participate in the teleconference session 104. In this example, the teleconference session 104 may be hosted, over one or more network(s) 108, by the system 102. That is, the system 102 may provide a service that enables users of the client computing devices 106(1) through 106(N) to participate in the teleconference session 104. As an alternative, the teleconference session 104 may be hosted by one of the client computing devices 106(1) through 106(N) utilizing peer-to-peer technologies.

The system 102 includes device(s) 110 and the device(s) 110 and/or other components of the system 102 may include distributed computing resources that communicate with one another, with the system 102, and/or with the client computing devices 106(1) through 106(N) via the one or more network(s) 108. In some examples, the system 102 may be an independent system that is tasked with managing aspects of one or more teleconference sessions 104. As an example, the system 102 may be managed by entities such as SLACK®, WEBEX®, GOTOMEETING®, GOOGLE HANGOUTS®, etc.

Network(s) 108 may include, for example, public networks such as the Internet, private networks such as an institutional and/or personal intranet, or some combination of private and public networks. Network(s) 108 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, and so forth) or any combination thereof. Network(s) 108 may utilize communications protocols, including packet-based and/or datagram-based protocols such as Internet protocol ("IP"), transmission control protocol ("TCP"), user datagram protocol ("UDP"), or other types of protocols. Moreover, network(s) 108 may also include a number of devices that facilitate network communications and/or form a hardware basis for the networks, such as switches, routers, gateways, access points, firewalls, base stations, repeaters, backbone devices, and the like.

In some examples, network(s) 108 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.11 standards (e.g., 802.11g, 802.11n, and so forth), and other standards.

In various examples, device(s) 110 may include one or more computing devices that operate in a cluster or other grouped configuration to share resources, balance load, increase performance, provide fail-over support or redundancy, or for other purposes. For instance, device(s) 110 may belong to a variety of classes of devices such as traditional server-type devices, desktop computer-type devices, and/or mobile-type devices. Thus, although illustrated as a single type of device—a server-type device—device(s) 110 may include a diverse variety of device types and are not limited to a particular type of device. Device(s) 110 may represent, but are not limited to, server computers, desktop computers, web-server computers, personal computers, mobile computers, laptop computers, mobile phone, tablet computers, or any other sort of computing device.

A client computing device (e.g., one of client computing device(s) 106(1) through 106(N)) may belong to a variety of classes of devices, which may be the same as, or different from, device(s) 110, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality (AR) device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. In some implementations, a client computing device includes input/output ("I/O") interfaces that enable communications with input/output devices such as user input devices including peripheral input devices (e.g., a game controller, a keyboard, a mouse, a pen, a voice input device, a touch input device, a gestural input device, and the like) and/or output devices including peripheral output devices (e.g., a display, a printer, audio speakers, a haptic output device, and the like).

Client computing device(s) 106(1) through 106(N) of the various classes and device types can represent any type of computing device having one or more processing unit(s) 112 operably connected to computer-readable media 114 such as via a bus 116, which in some instances can include one or more of a system bus, a data bus, an address bus, a PCI bus, a Mini-PCI bus, and any variety of local, peripheral, and/or independent buses.

Executable instructions stored on computer-readable media 114 may include, for example, an operating system 128, a client module 130, a profile module 132, and other modules, programs, or applications that are loadable and executable by processing units(s) 112.

Client computing device(s) 106(1) through 106(N) may also include one or more interface(s) 134 to enable communications with other input devices 148 such as network interfaces, cameras, keyboards, touch screens 106(3), and pointing devices (mouse). For example, the interface(s) 134 that enable communications between client computing device(s) 106(1) through 106(N) and other networked devices, such as device(s) 110 and/or devices of the system 102, over network(s) 108. Such network interface(s) 134 may include one or more network interface controllers (NICs) or other types of transceiver devices to send and receive communications and/or data over a network.

In the example environment 100 of FIG. 1, client computing devices 106(1) through 106(N) may use their respective client modules 130 to connect with one another and/or other external device(s) in order to participate in the teleconference session 104. For instance, a first user may utilize a client computing device 106(1) to communicate with a second user of another client computing device 106(2). When executing client modules 130, the users may share data, which may cause the client computing device 106(1) to connect to the system 102 and the other client computing devices 106(2) through 106(N) to connect over the network 108.

The client module 130 of each client computing device 106(1) through 106(N) may include logic that detects user input and communicates control signals to the server module 136 to request changes in the view of the teleconference session 104 on the display. For example, the client module 130 in the first client computing device 106(1) in FIG. 1 may detect a user input at an input device 148. The user input may be sensed, for example, as a finger press on a user interface element displayed on a touchscreen, or as a click of a mouse on a user interface element selected by a pointer on the display 150. The client module 130 translates the user input according to a function associated with the selected user interface element. In some cases, the client module 130 may require the teleconference session 104 to perform a function. In this case, the client module 130 sends a control signal 156(1) to the server module 136 for service by the teleconference session 104.

In one example function, the user of the client computing device 106(1) may wish to cause a transition of the view on the display 150 of the client computing device 106(1) to emphasize content over media relating to content or participants of the teleconference session 104. The user may click on the desired user interface element on the user's display 150. In response, the client module 130 sends the control signal 156(1) to the server module 136. The server module 136 would, in response to the control signal 156(1) perform the desired transition of the views on the user's display 150 by transitioning the view on the display of a teleconference data 146(1).

The client computing device(s) 106(1) . . . 106(N) may use their respective profile modules 132 to generate participant profiles, and provide the participant profiles to other client computing devices and/or to the device(s) 110 of the system 102. A participant profile may include one or more of an identity of a participant (e.g., a name, a unique identifier ("ID"), etc.), participant data, such as personal data and location data may also be stored. Participant profiles may be utilized to register participants for teleconference sessions 104.

As shown in FIG. 1, the device(s) 110 of the system 102 includes a server module 136, a data store 138, and an output module 140. The server module 136 is configured to receive, from individual client computing devices 106(1) through 106(N), stream 142(1) through 142(M) (where M is a positive integer number equal to 2 or greater). In some scenarios, not all the client computing devices utilized to participate in the teleconference session 104 provide an instance of streams 142, and thus, M (the number of instances submitted) may not be equal to N (the number of client computing devices). In some other scenarios, one or more of the client computing devices may be communicating an additional stream or transmission of media data that includes content, such as a document or other similar type of media intended to be shared during the teleconference session.

The server module 136 is also configured to receive, generate and communicate session data 144 and to store the session data 144 in the data store 138. In various examples, the server module 136 may select aspects of the streams 142 that are to be shared with the client computing devices 106(1) through 106(N). The server module 136 may combine the streams 142 to generate teleconference data 146 defining aspects of the teleconference session 104. The teleconference data 146 can comprise select streams 142. The teleconference data 146 can define aspects of the teleconference session 104, such as a user interface arrangement of the user interfaces on the clients, the type of data that is displayed and other functions of the server and clients. The server module 136 may configure the teleconference data 146 for the individual client computing devices 106(1)-106(N). Teleconference data, which can include individual instances referenced as 146(1)-146(N). The output module 140 may communicate the teleconference data instances 146(1)-146(N) to the client computing devices 106(1) through 106(N). Specifically, in this example, the output module 140 communicates teleconference data 146(1) to client computing device 106(1), teleconference data 146(2) to client computing device 106(2), teleconference data 146(3) to client computing device 106(3), and teleconference data 146(N) to client computing device 106(N), respectively.

The teleconference data instances 146(1)-146(N) may communicate audio that may include video representative of the contribution of each participant in the teleconference session 104. Each teleconference data instance 146(1)-146(N) may also be configured in a manner that is unique to the needs of each participant user of the client computing devices 106(1) through 106(N). Each client computing device 106(1)-106(N) may be associated with a teleconference session view. Examples of the use of teleconference session views to control the views for each participant at the client computing devices are described with reference to FIG. 2.

Figure 2:
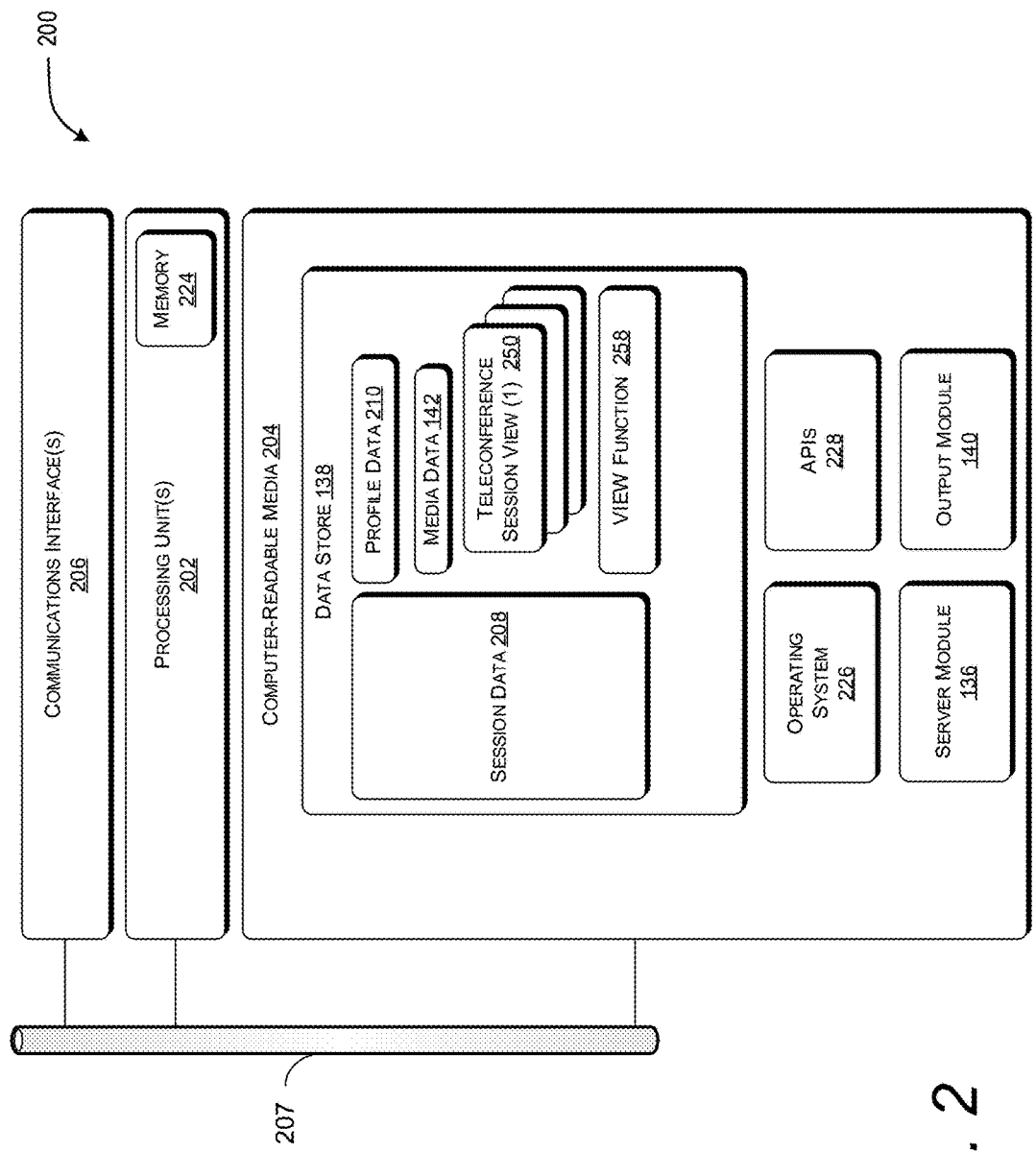
FIG. 2 is a block diagram of an example of the device in the teleconference system of FIG. 1.

In FIG. 2, a system block diagram is shown illustrating components of an example device 200 configured to provide the teleconference session 104 between the client computing devices, such as client computing devices 106(1) through 106(N) in accordance with an example implementation. The device 200 can be used to illustrate some components of one of the client computing devices 106. In addition, the device 200 may represent one of device(s) 110 where the device 200 includes one or more processing unit(s) 202, computer-readable media 204, and communication interface(s) 206. The components of the device 200 are operatively connected, for example, via a bus 207, which may include one or more of a system bus, a data bus, an address bus, a PCI bus, a Mini-PCI bus, and any variety of local, peripheral, and/or independent buses.

As utilized herein, processing unit(s), such as the processing unit(s) 202 and/or processing unit(s) 112, may represent, for example, a CPU-type processing unit, a GPU-type processing unit, a field-programmable gate array ("FPGA"), another class of digital signal processor ("DSP"), or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 204 and/or computer-readable media 114, may store instructions executable by the processing unit(s). The computer-readable media may also store instructions executable by external processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media may include computer storage media and/or communication media. Computer storage media may include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media may embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

Communication interface(s) 206 may represent, for example, network interface controllers ("NICs") or other types of transceiver devices to send and receive communications over a network.

In the illustrated example, computer-readable media 204 includes the data store 138. In some examples, the data store 138 includes data storage such as a database, data warehouse, or other type of structured or unstructured data storage. In some examples, the data store 138 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 138 may store data for the operations of processes, applications, components, and/or modules stored in computer-readable media 204 and/or executed by processing unit(s) 202 and/or accelerator(s). For instance, in some examples, the data store 138 may store session data 208 (e.g., session data 144), profile data 210, and/or other data. The session data 208 may include a total number of users in the teleconference session 104, and activity that occurs in the teleconference session 104 (e.g., behavior, activity of the participants), and/or other data related to when and how the teleconference session 104 is conducted or hosted. Examples of profile data 210 include, but are not limited to, a user identity ("ID") and other data.

In an example implementation, the data store 138 stores data related to the view each user experiences on the display of the users' client computing devices 106. As shown in FIG. 2, the data store 138 may include a teleconference session view 250(1) through 250(N) corresponding to the display of each client computing device 106(1) through 106(N) participating in the teleconference session 104. In this manner, the system 102 may support individual control over the view each user experiences during the teleconference session 104. For example, as described in more detail below, the system 102 permits a user to participate with an overlay view or a persistent view displayed on the user's client computing device 106.

Overlay views feature the display of desired media in a primary display area, referred to herein as "a stage," that may substantially cover an entire display screen. Controls, user interface elements, such as icons, buttons, menus, etc., and other elements not directly relevant to the presentation provided by the teleconference session on the display do not appear. A persistent view provides a stage, or first display area, that covers a dominant area of the display and one or more marginal, or secondary, display areas that render other aspects of the teleconference session.

Persistent and overlay views provide the user with options for how the user may experience the teleconference session 104. The view on a user's display may be changed under user control to emphasize different aspects of a teleconference session based on the interest of the user. A user may wish to view content, such as a document, or presentation, more closely than the media being communicated from the participants/presenters. Each user may focus, or promote the content over the participants by having the content displayed in the first display area. Conversely, a user may wish to engage more closely with participants by promoting the media transmitted by the participants to the first display area of the display.

The user may also wish to change the experience of the teleconference session 104 by switching between the overlay and the persistent views. Other views may also be available to further expand the options for experiencing the teleconference session to each user. For example, the user may have a distinct role in the teleconference, such as that of a presenter. As such, the presenter may lead the teleconference and provide content to share with the other users. In one view, referred to below as a floating monitor view, the presenter may share his or her desktop with the other users to view as content in a persistent view. The presenter's floating monitor view may include a monitor provided as a user interface element associated with the presenter's media data overlaid on the presenter's desktop. The presenter may move the presenter's user interface element to different parts of the display. In example implementations, the presenter's user interface would not be visible to the other participants.

The data store 138 may store data relating to other views available during a teleconference session 104. Some teleconference sessions may involve a large number of participants. However, only a core number of the participants may be what can be referred to as "active participants." The teleconference session view for each user may be configured to focus on media provided by the most active participants. Some teleconference sessions may involve a presenter, such as in a seminar, or a presentation by one or more individuals. At any given time, one participant may be a presenter, and the presenter may occupy an enhanced role in a teleconference session. The presenter's role may be enhanced by maintaining a consistent presence on the user's display.

During a teleconference session, a participant may wish to transition the views of the session to emphasize or promote either content or people. The user can select a user interface element representing the people or content the user wants to promote. The selection is communicated to the server 136 in a control signal 156. The server 136 may modify a teleconference session view 250 accordingly.

As noted above, the data store 138 may store the profile data 210, streams 142, teleconference session views 250, session data 208, and a view function 258. Alternately, some or all of the above-referenced data can be stored on separate memories 224 on board one or more processing unit(s) 202 such as a memory on board a CPU-type processor, a GPU-type processor, an FPGA-type accelerator, a DSP-type accelerator, and/or another accelerator. In this example, the computer-readable media 204 also includes operating system 226 and application programming interface(s) 228 configured to expose the functionality and the data of the device(s) 110 (e.g., example device 200) to external devices associated with the client computing devices 106(1) through 106(N). Additionally, the computer-readable media 204 includes one or more modules such as the server module 136 and an output module 140, although the number of illustrated modules is just an example, and the number may vary higher or lower. That is, functionality described herein in association with the illustrated modules may be performed by a fewer number of modules or a larger number of modules on one device or spread across multiple devices.

As such and as described earlier, in general, the system 102 is configured to host the teleconference session 104 with the plurality of client computing devices 106(1) through 106(N). The system 102 includes one or more processing units 202 and a computer-readable medium 204 having encoded thereon computer-executable instructions to cause the one or more processing units 202 to receive streams 142(1) through 142(M) at the system 102 from a plurality of client computing devices 106(1) through 106(N), select streams 142 based, at least in part, on the teleconference session view 250 for each user, and communicate a teleconference data 146 according to the teleconference session views 250 corresponding to the client computing devices 106(1) through 106(N). The teleconference data 146(1) through 146(N) are communicated from the system 102 to the plurality of client computing devices 106(1) through 106(N). The teleconference session views 250(1) through 250(N) cause the plurality of client computing devices 106(1) through 106(N) to display views of the teleconference session 104 under user control. The computer-executable instructions also cause the one or more processing units 202 to determine that the teleconference session 104 is to transition to a different teleconference session view of the teleconference session 104 based on a user communicated control signal 156, also referred to herein as a control command 156. The stream 142 is also communicated from the system 102 to the plurality of client computing devices 106(1) through 106(N).

In some implementations, the techniques disclosed herein may utilize one or more predetermined interface arrangements, also referred to as "views," or "teleconference session views." In an example of operation, the system 102 performs a method that includes receiving the streams 142(1) through 142(N) at the system 102 from a plurality of client computing devices 106(1) through 106(N), combining and formatting the streams 142 based, at least in part, on a selected teleconference session view for each client computing device to form a teleconference data 146(1) through 146(N), and transmitting a teleconference data 146(1) through 146(N) to each client computing device.

As will be described below, the predetermined interface arrangements of the teleconference session views can include a first display area (referred to herein as a "canvas" or "stage") and a second display area (referred to herein as a display area that displays "thumbnails"). In some implementations, the second display area can individually be configured as a region comprising selectable user interface elements for selecting streams of media data associated with the individual sections. The predetermined interface arrangements can also include graphical elements providing control functionality ("control elements") for a teleconference session. For instance, a graphical element may be generated on the user interface enabling a user to provide content, end a session, mute one or more sounds, etc.

In one illustrative example, the techniques disclosed below can utilize an overlay view. The overlay view may comprise one or more control elements. In some configurations, the control elements can be displayed to the user for a predetermined period of time and then fade after the predetermined period of time has lapsed. In response to certain types of user activity, such as hovering a pointing device over a predetermined area of the user interface, the control elements may reappear for a predetermined time period. In the overlay view, the second display area is positioned as an overlay on the first display area.

The overlay view can include the presentation of people or content in a first display area and the presentation of people or content in a second display area. The second display area, which includes the user interface elements, may be displayed for a predetermined period of time overlaid on the first display area in a user-ON state, and then fade after the predetermined period of time has lapsed. When the second display area is not displayed, the user interface is described herein as being in the "user-OFF" state. The user-OFF state allows a display of on-stage media without the display of the overlaid user interface elements. In addition, in the overlay view, the second display area overlaps the first display area. In some configurations, the first display area is larger than the second display area. For illustrative purposes, such an arrangement is described herein as an overlapping configuration.

In another illustrative example, the techniques disclosed herein can utilize a persistent view. The persistent view can provide one or more control elements, which can be configured as described above. In general, the persistent view is designed to provide an interface optimized for sharing content. The persistent view can include the presentation of people or content in a first display area or, either content or people in the second display area. In the persistent view, the presentation of the people or content in the second display area does not fade after a predetermined period of time. In the persistent view, the first display area and the second display area are positioned in a non-overlapping configuration. In some cases, first display area and the second display area are concurrently displayed. In some configurations, the first display area and the second display area are in a side-by-side arrangement.

As summarized above, the techniques disclosed herein provide coordination between moving elements of a UI to bring emphasis to salient activity of a teleconference session. FIGS. 3A-3I are screenshot views of a UI showing one example of such coordination. The example shown in FIGS. 3A-3I involves a UI arranged according to the persistent view described above.

FIG. 3A illustrates one example of a representative UI 300 (also referred herein as a "persistent teleconference session view 300" or a "teleconference session view 300") comprising a first display area 301 and a second display area 302. In some configurations, the first display area 301 can be larger than the second display area 302. The first display area 301 can include a rendering of a first stream 325 of the teleconference data.

For example, the rendering of the first stream 325 of the teleconference data 146 can include an image of a chart, which can be displayed within the first display area 301, e.g., a dominant section, of the UI 300. The second display area 302 can include a rendering of a second stream 320 of the teleconference data 146. For example, the second stream 320 of the teleconference data can include video streams of one or more participants or other content. FIG. 3A shows a "ME" user interface element 330 having an image, an avatar, or a video of the user of the client computing device 106(1).

In some configurations, the participants or content displayed within the second display area 302 are selected based on a level of activity associated with the second stream of the teleconference data. In such embodiments, the second stream 320 of the teleconference data 146 can contain salient activity of a teleconference session. In some configurations, the second display area can include a rendering of a plurality of streams of the teleconference data 146.

For instance, in the persistent view, any predetermined number of participants or content can be displayed and arranged within the second display area 302, wherein the selection of the participants or content can be based on an activity level priority associated with each participant or content. In addition, the order of the participants or content can be based on an activity level priority associated with individual streams of the teleconference data 146 containing participants or content. FIG. 3A shows an example of such a display. Although this example shows four streams of the teleconference data 146, the second display area 302 can display any number of streams that are selected and arranged based on the associated activity level priorities.

In configuring the teleconference session view 300, streams of a teleconference data, which can include streams of media data, may be arranged in a teleconference session view based on an activity level priority for each media data presented by each participant. The video or shared content in the media data for each participant may be analyzed to determine an activity level priority, which is also referred to herein as an "activity level," for any stream of a teleconference data. In some configurations, where a client computing device configures a view or UI based on a participant's activity, a server can generate data indicating an activity level associated with individual streams of the teleconference data. Then the data indicating an activity level associated with individual streams can be communicated to the client computing device. Also, in some configurations, the client computing device can generate data indicating an activity level associated with individual streams of the teleconference data.

The activity level priority can be based on the analysis of individual streams of the teleconference data, and an activity level priority can be associated with a group of participants, individual participants, or content. The activity level priority can be based on any type of activity including, but not limited to, the following examples. Participant motion: the extent to which a participant moves in the video may determine the participant's activity level. Participants in the process of gesturing or otherwise moving in the video may be deemed to be participating at a relatively high level in the teleconference. Participant lip motion: any video stream can be analyzed to determine the extent to which a participant's lips move as an indication of the extent to which the participant is speaking Participants speaking at a relatively high level may be deemed to be participating at a corresponding relatively high level. Participant facial expressions: the participant's video may be analyzed to determine changes in facial expressions, or to determine specific facial expressions using pattern recognition. Participants reacting through facial expressions in the teleconference may be deemed to be participating at a relatively high level. Content modification: video of content or any electronic version of content being shared in the teleconference may be analyzed to determine if it is being or has been modified. The user interface element corresponding to content may be promoted in rank in the second display area or automatically promoted to the first display area if the video indicates the content is being modified. An extent or degree of modification, such as a frequency of modification, a number of people participating in the modification, along with other activity can be used to determine an activity level priority. Content page turning: video of content being shared may be analyzed to determine if there is page turning of a document, for example, and assigned a corresponding activity level priority. A number of participants having content in the first display area: video of content being shared may be assigned an activity level priority based on the number of participants that have a view of the content in the first display area or second display area. Participant entering teleconference session: media data from participants entering a teleconference session may be assigned a high activity level priority. A priority value can be based on the order in which participants join a session. Participant leaving teleconference session: media data from participants leaving a teleconference may be assigned a low activity level priority.

A transition of the UI 300 can be caused by a number of suitable actions. For instance, the system 100 can receive a control command for causing a transition of the teleconference session view. The control command, for example, can be invoked by a computer or invoked by a user. The source of the control command can include, but is not limited to, receiving a user input, receiving a user voice command, receiving a command issued by a remote computer, etc. In one specific example, the second display area 302 can be configured with a selectable user element. The selectable user element can be arranged, for instance, around the rendering of the second stream 320. Thus, a transition can be initiated when the user selects the rendering of the second stream 320.

In response to receiving the control command, the system 102 can cause the rendering of a stream to transition from one display area of the UI 300 to another display area of the UI 300. With reference to the example shown in FIGS. 3A-3I, in response to receiving the control command, the display of the video or images of the participants or other content, e.g., the rendering of the second stream, can transition from the second display area 302 to the first display area 301.

The transition of the UI can involve several coordinated animated movements to enable users to track the movement of people or content from one area of the UI to another. For instance, in response to receiving the control command, the rendering of the second stream 320 within the second display area 302 can begin to move toward the first display area 301. In some configurations, the movement of the rendering of the second stream 320 within the second display area 302 can involve an animation where the rendering of the second stream 320 appears to slide toward the first display area 301. As shown in FIGS. 3A-3E, the rendering of the second stream 320 appears to slide in a vertical direction toward the first display area 301.

In association with the movement of the rendering of the second stream 320 within the second display area 302, the system 102 can also display a rendering of the second stream 320 in the first display area 301. For instance, as shown in FIG. 3F, the display of the video or images of the participants or other content, e.g., the rendering of the second stream 320, can appear on the first display area 301.

The rendering of the second stream 320 in the first display area 301 can also involve an animated movement, where the rendering of the second stream 320 within the first display area 301 moves from a first position (as shown in FIG. 3F) to a final position (as shown in FIG. 3I) within the first display area 301. In some configurations, the movement of the rendering of the second stream 320 within the first display 301 area can involve an animation where the rendering of the second stream appears 320 to slide away from the second display area 302 toward the final position.

The movement of the rendering of the second stream 320 within the second display area 302 and the movement of the rendering of the second stream 320 within the first display area 301 are coordinated to bring focus to important activity of a session 104, which in some cases may involve salient activity moving from one section of the UI to another. Thus, the display of a stream can move from one display area to another display area in a coordinated manner allowing a user to follow the movement and focus on the salient activity.

In some configurations, the rendering of the first stream 325 within the first display area 301 can fade prior to the display of the second stream 320 within the first display area 301. In some configurations, the display of the second stream 320 within the first display area 301 can move from a first position toward a final position. For instance, as shown in FIGS. 3F to 3I, the people displayed within the first display area 301 can slide from the first position (FIG. 3F) to a final position (FIG. 3I). In such configurations, the rendering of the first stream 325 within the first display area 301 (FIG. 3E) can fade prior to the rendering of the second stream 320 moving from the first position toward the final position. In some configurations, the rendering of the first stream 325 within the first display area 301 (FIG. 3E) can fade while the rendering of the second stream 320 moves from the first position toward the final position.

For illustrative purposes, the movement of the rendering of the second stream 320 within the second display area 302 is referred to as a "throw," and the movement of the rendering of the second stream 320 within the first display area 301 is referred to as a "catch." The throw and the catch movements enable users to track the movement of people or content. In some configurations, the velocity of the throwing motion and the catching motion can be configured to bring focus to the movement of salient activity. For example, the velocity of the throwing motion and the catching motion can be constant. In another example, the velocity of the of the throwing motion and the catching motion can be based on an easing curve. As will be described in more detail below, an easing curve involves an exponential increase in the velocity of the throwing motion, and an exponential decrease of the velocity of the catching motion.

Also shown in FIGS. 3A-3I, in response to the control command, the rendering of the second stream 320, e.g., the display of people, in the second display area 302 can be replaced by a rendering of the second stream 325, e.g., the chart. Also as shown, the rendering of the first stream 325 in the second display area 302 can move in a predetermined direction to deemphasize the movement of such content. In some configurations, the rendering of the first stream 325 in the second display area 302 moves from a starting position (FIG. 3G), the starting position showing at least a part of the rendering of the first stream 325, to a final position (FIG. 3I) within the second display area 302. In this example, final position within the second display area 302 is positioned closer to the first display area 301 than the starting position, thus resulting in the rendering of the first stream 325 moving in a vertical direction, in this case, from the bottom of the UI toward the first display area 301.

In some configurations, the teleconference session view 300 further comprises a rendering of a plurality of passive elements 310A-310D, which are individually and generically referred to herein as "passive elements 310." Individual passive elements 310 can represent participants of the teleconference session 104. In comparison to active elements, which can include video streams of active participants (referred to herein as renderings of the second stream 320 of the teleconference data), the passive elements 310 represent participants that have an activity level below a threshold.

In some configurations, when the activity level of a participant represented as a passive element 310 increases above the threshold, that participant can be moved from a passive element 310 to an active element displayed as a video stream, e.g., a rendering of the second stream 320 of the teleconference data. In some configurations, when the activity level of a participant represented as a passive element 310 increases above an activity level of a participant represented as an active element, that participant can be moved from a passive element 310 to an active element displayed as a video stream.

The plurality of passive elements 310A-310D can be positioned at a starting position having a first distance (d1) between the passive elements 310 and the rendering of the second stream 320 within the second display area 302. The starting position of the passive elements 310 is shown in FIG. 3A. As described above, the rendering of the second stream 320 can be replaced with the rendering of the first stream 325 to within the second display area 302.

Figure 3B:
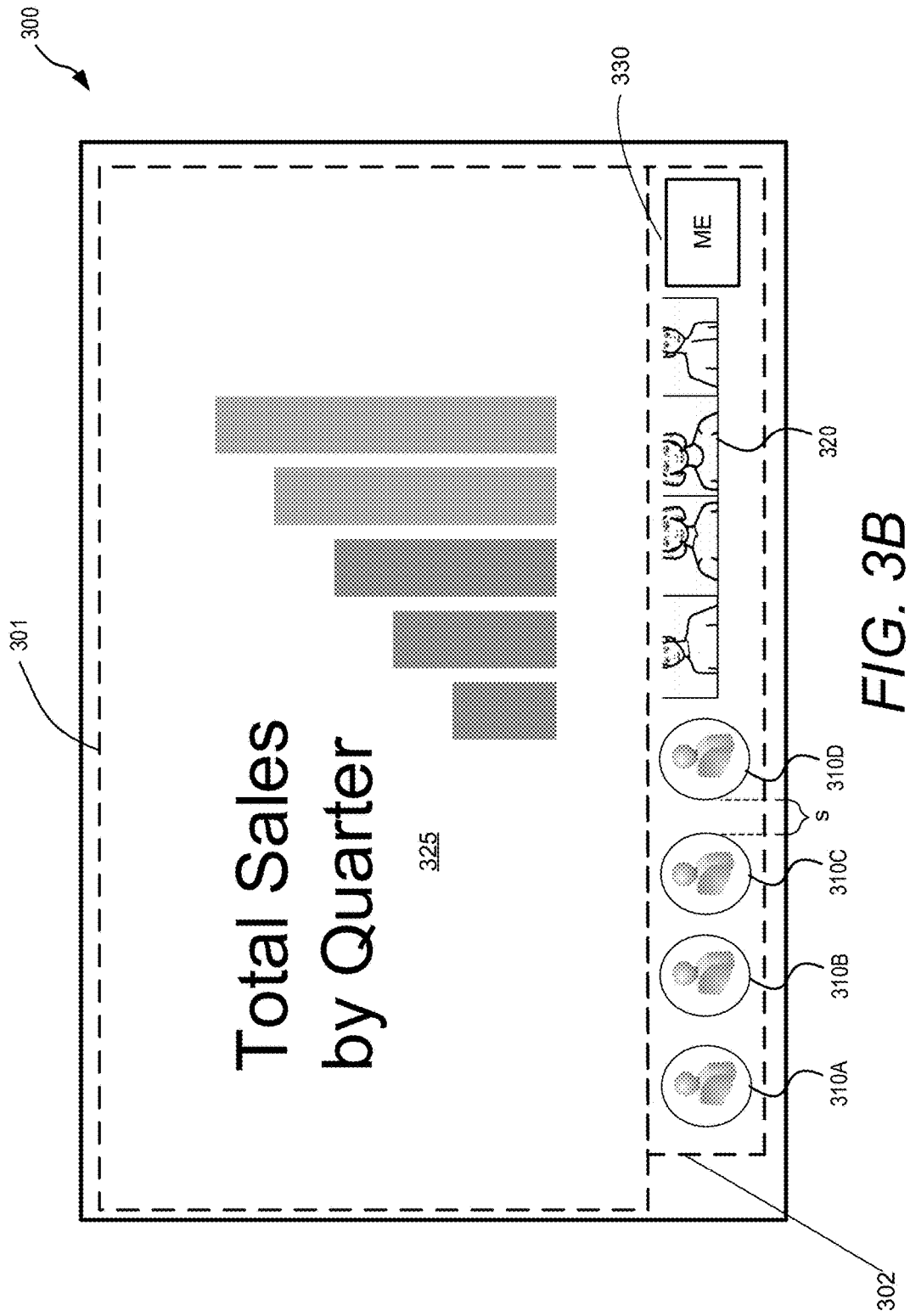
Figure 3C:
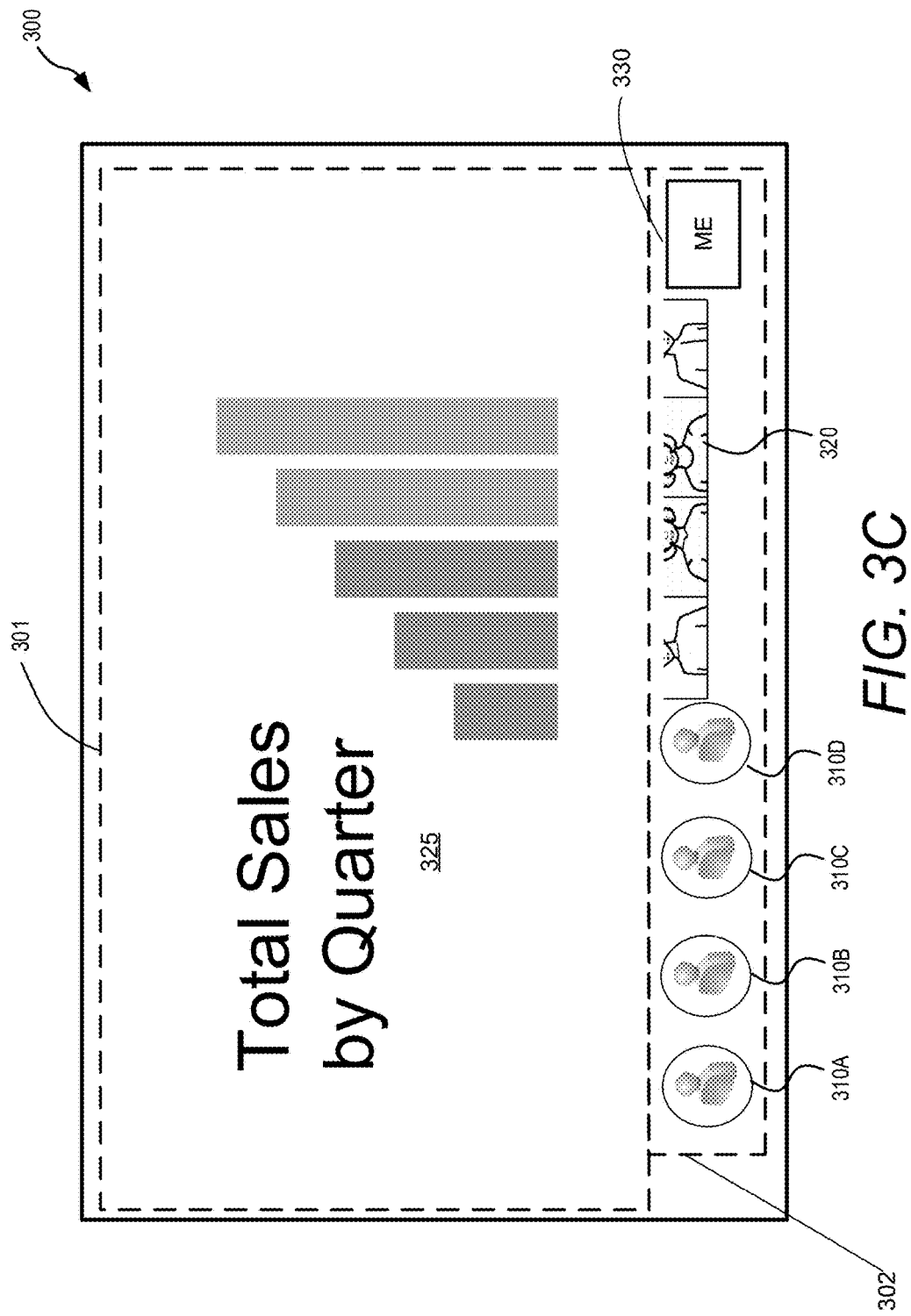
Figure 3D:
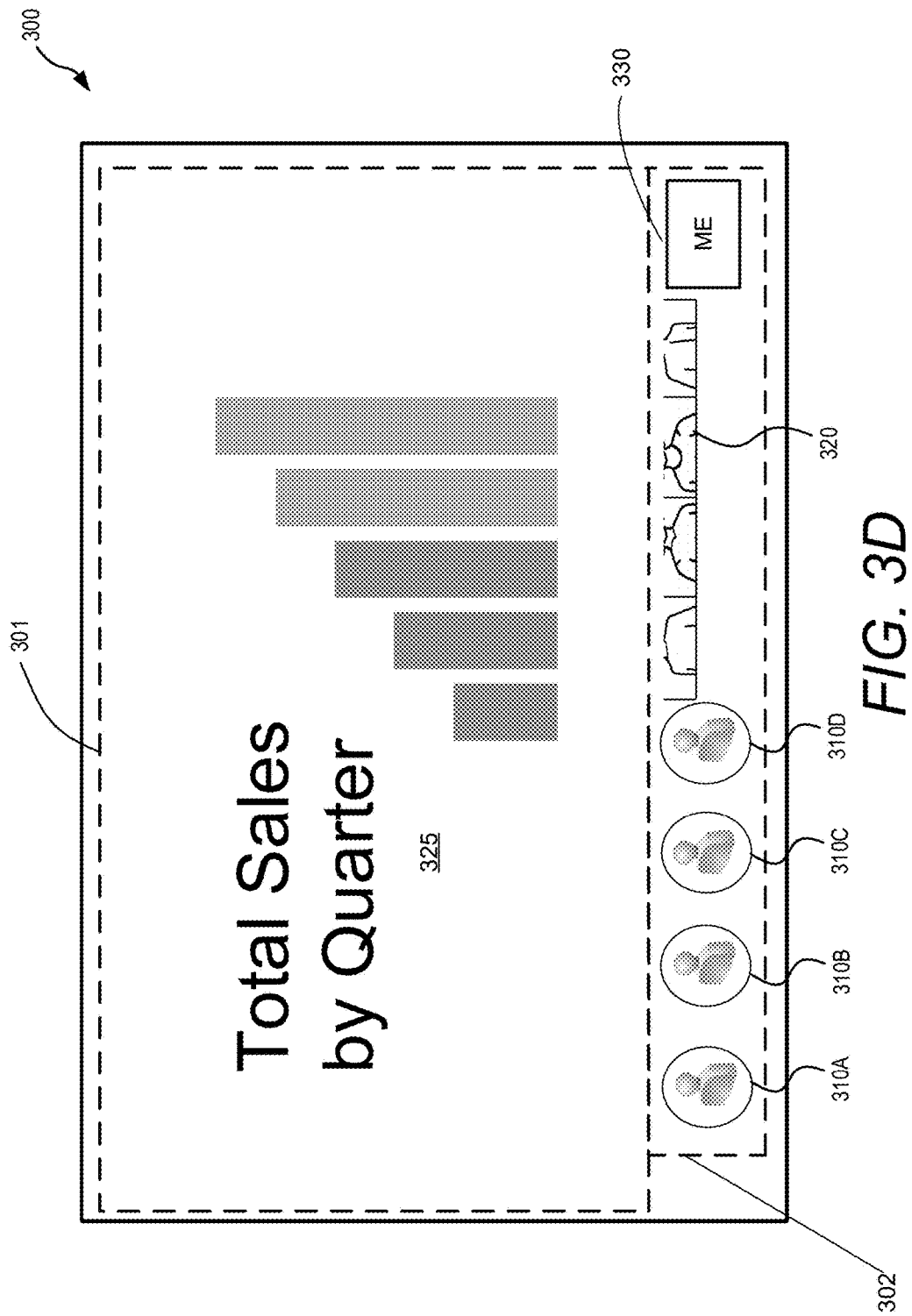
Figure 3E:
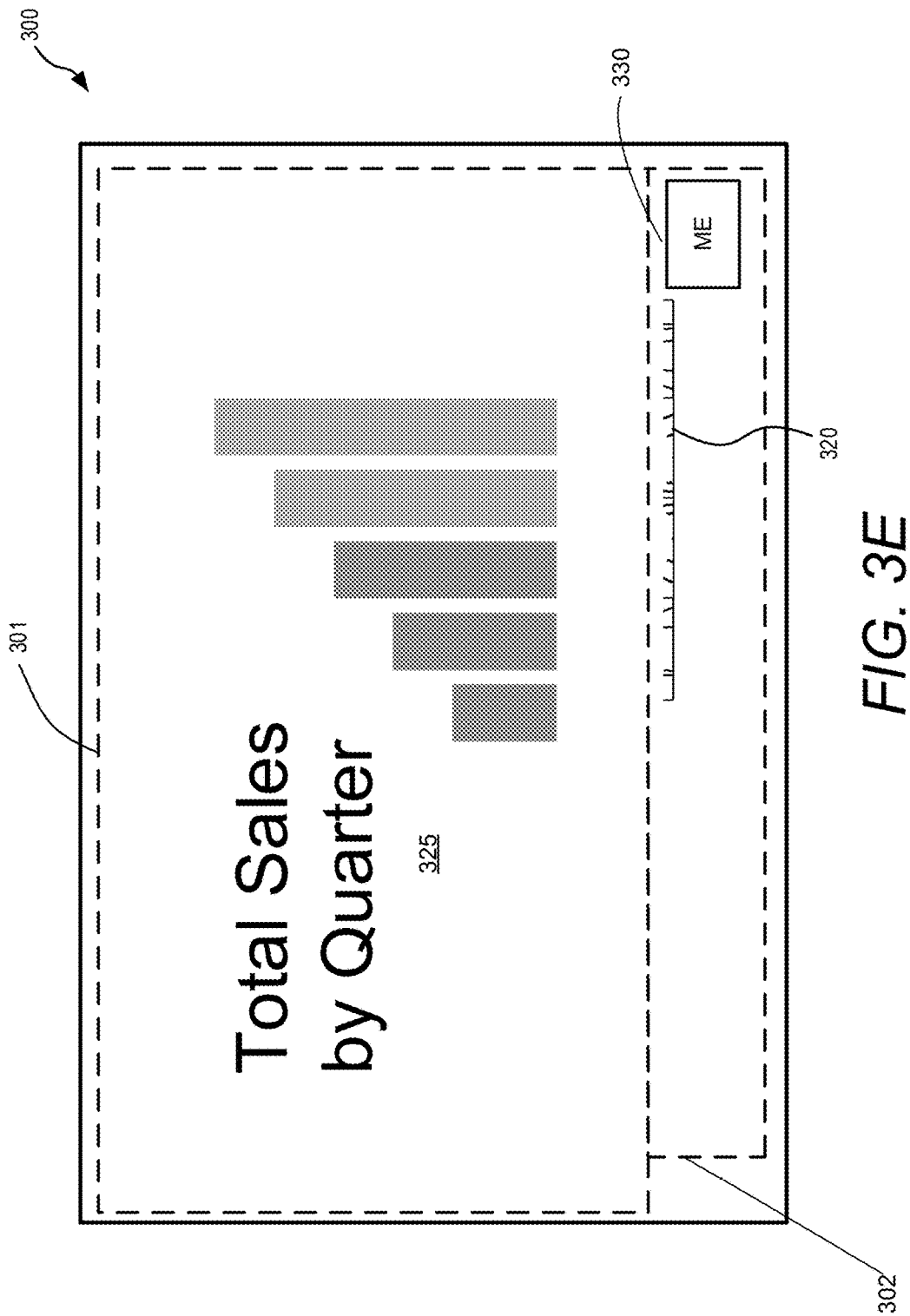
Figure 3G:
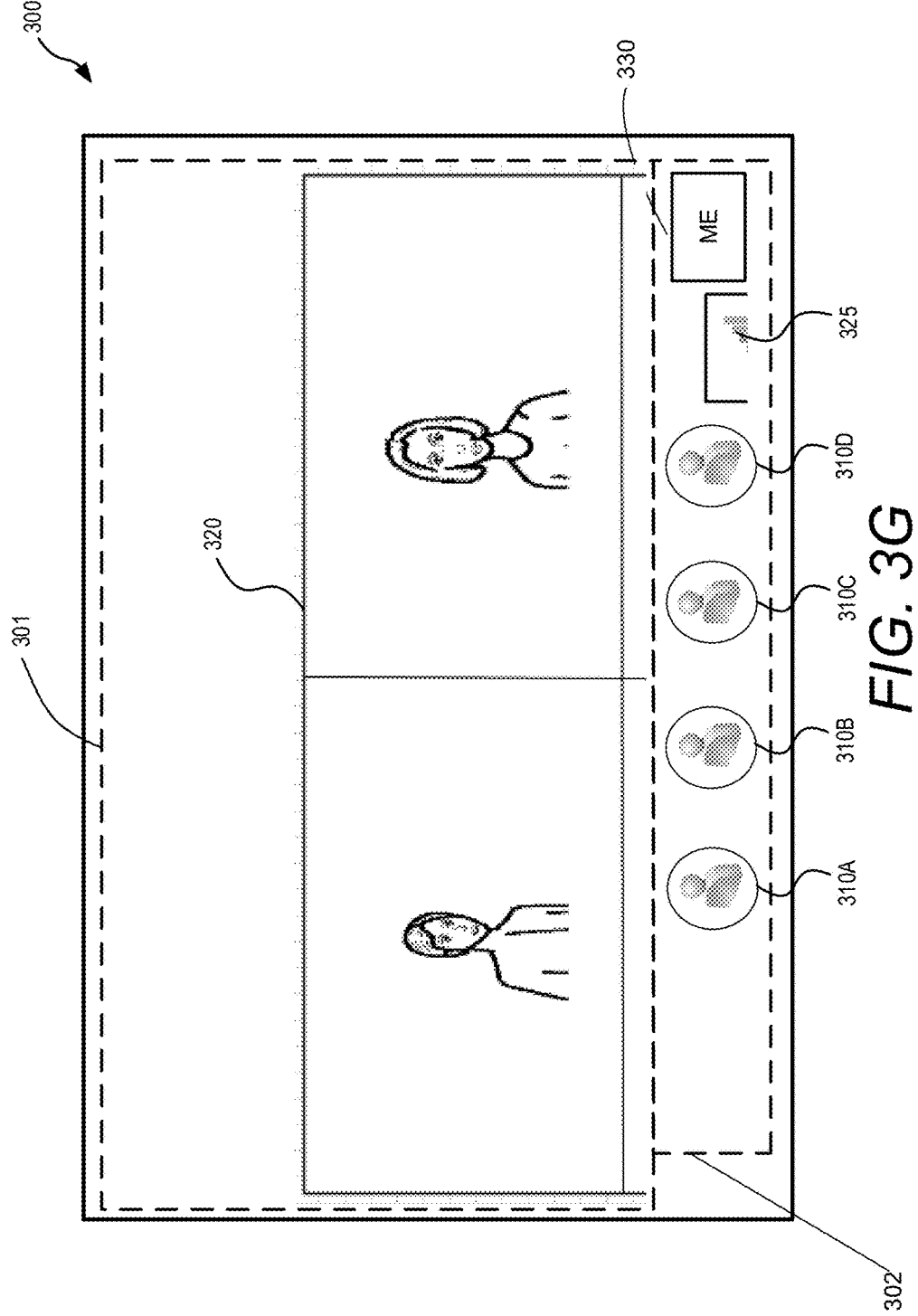
Figure 3H:
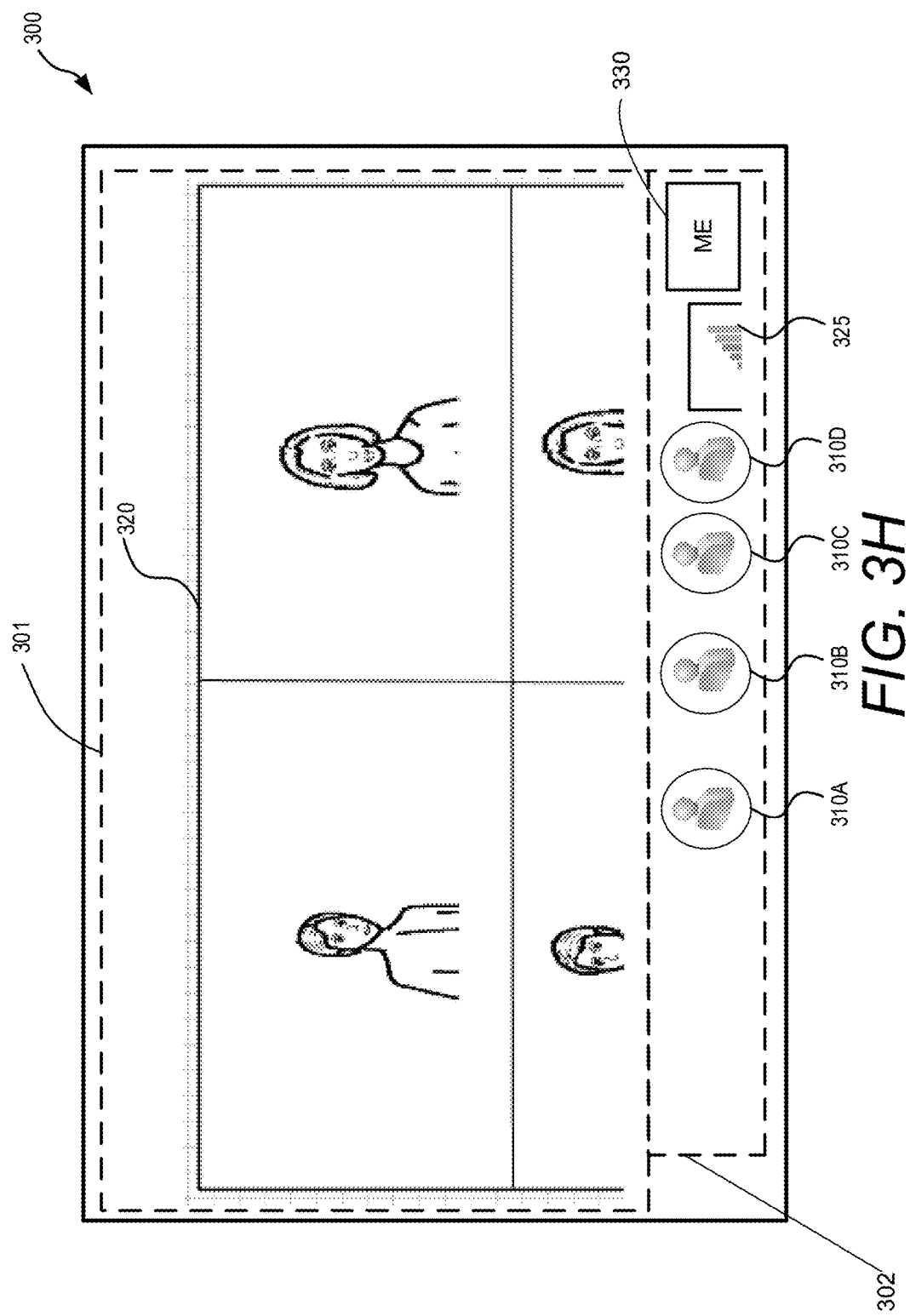

The transition can cause the rendering of the second stream 320 in the second display area 302 to be a different size than the rendering of the first stream 325 within the second display area 302. Thus, in some configurations, the plurality of passive elements 310A-310D may be moved from the starting position to a landing position having a second distance (d2) between the passive elements 310 and the rendering of the second stream 320 within the second display area 302. The landing position of the passive elements 310 is shown in FIG. 3I. The "throw" of the passive elements 310 is shown in FIGS. 3A-3D, and the "catch" of the passive elements 310 are shown in FIGS. 3F-3I. As shown in FIG. 3E, the system 102 may cause a visual break of the passive elements 310 while the passive elements 310 transition from the starting position to the landing position.

In some embodiments, the passive elements 310 can present several movement characteristics to allow users to follow the action. For instance, in association with the movement of the rendering of the second stream 320 within the second display area 302, the system 102 can cause the rendering of the plurality of passive elements 310 to move from the starting position to the landing position, wherein a spacing(s) between individual passive elements of the plurality of passive elements expands as the plurality of passive elements begin to move from the starting position, and wherein the spacing between individual passive elements contracts as the plurality of passive elements approach the landing position. These movement characteristics are illustrated in FIGS. 3A-3I.

Referring now to FIGS. 4A-4H, another example showing the coordination between moving elements of a UI to bring emphasis to salient activity is shown and described. The example shown in FIGS. 4A-4H involves a UI arranged according to the overlay view described above.

Figure 4A:
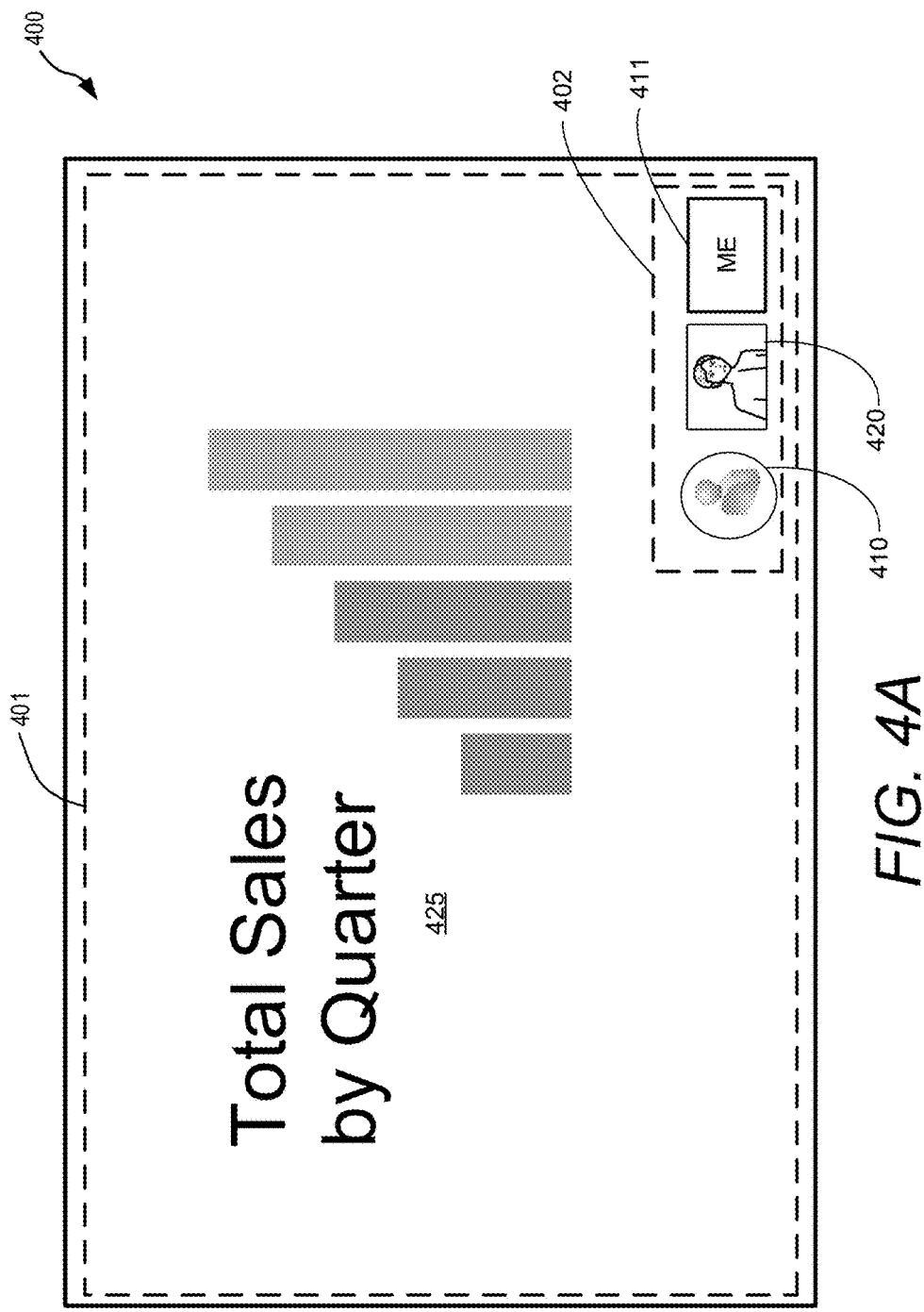
Figure 4B:
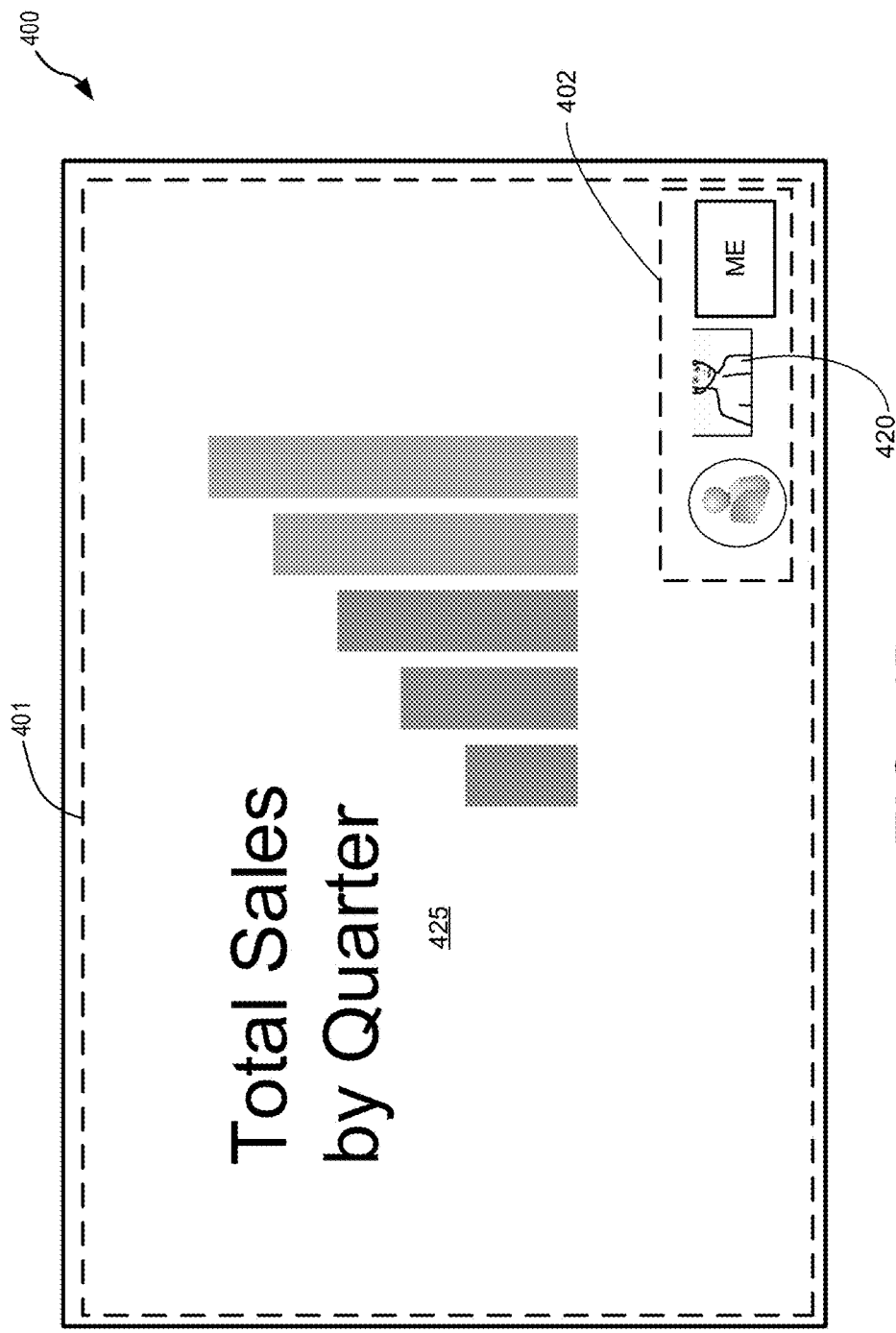
Figure 4D:
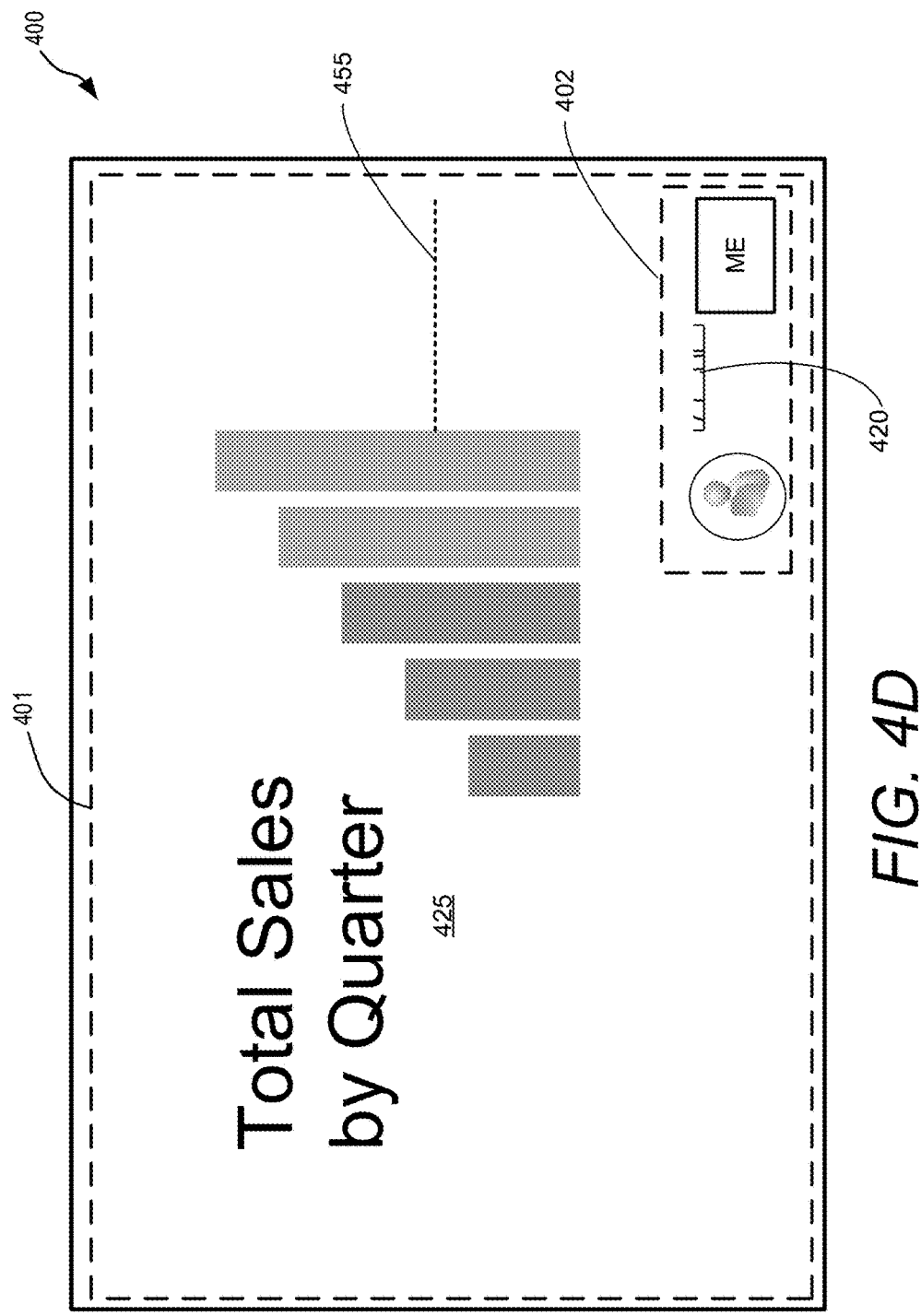
Figure 4E:
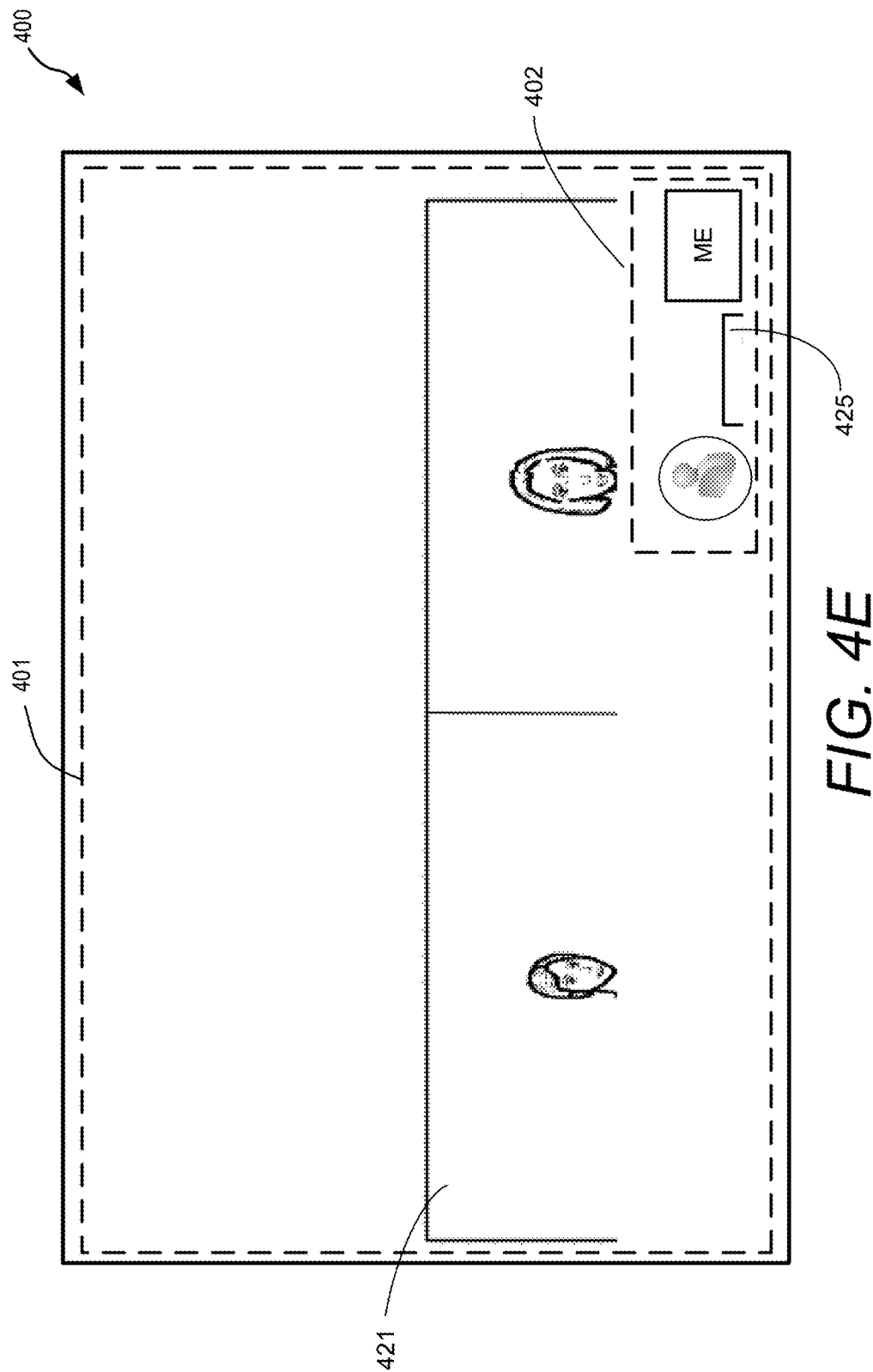
Figure 4F:
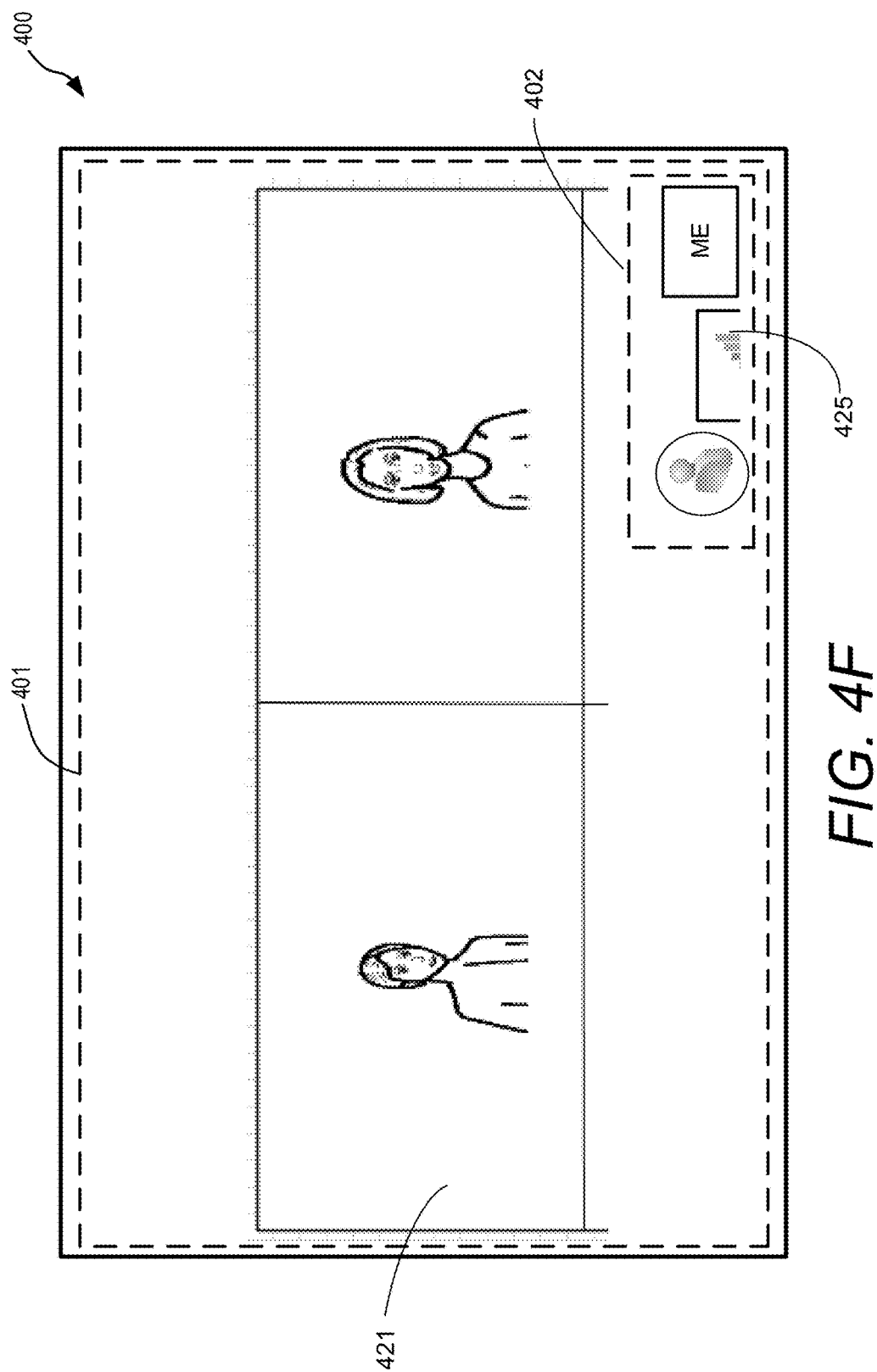
Figure 4G:
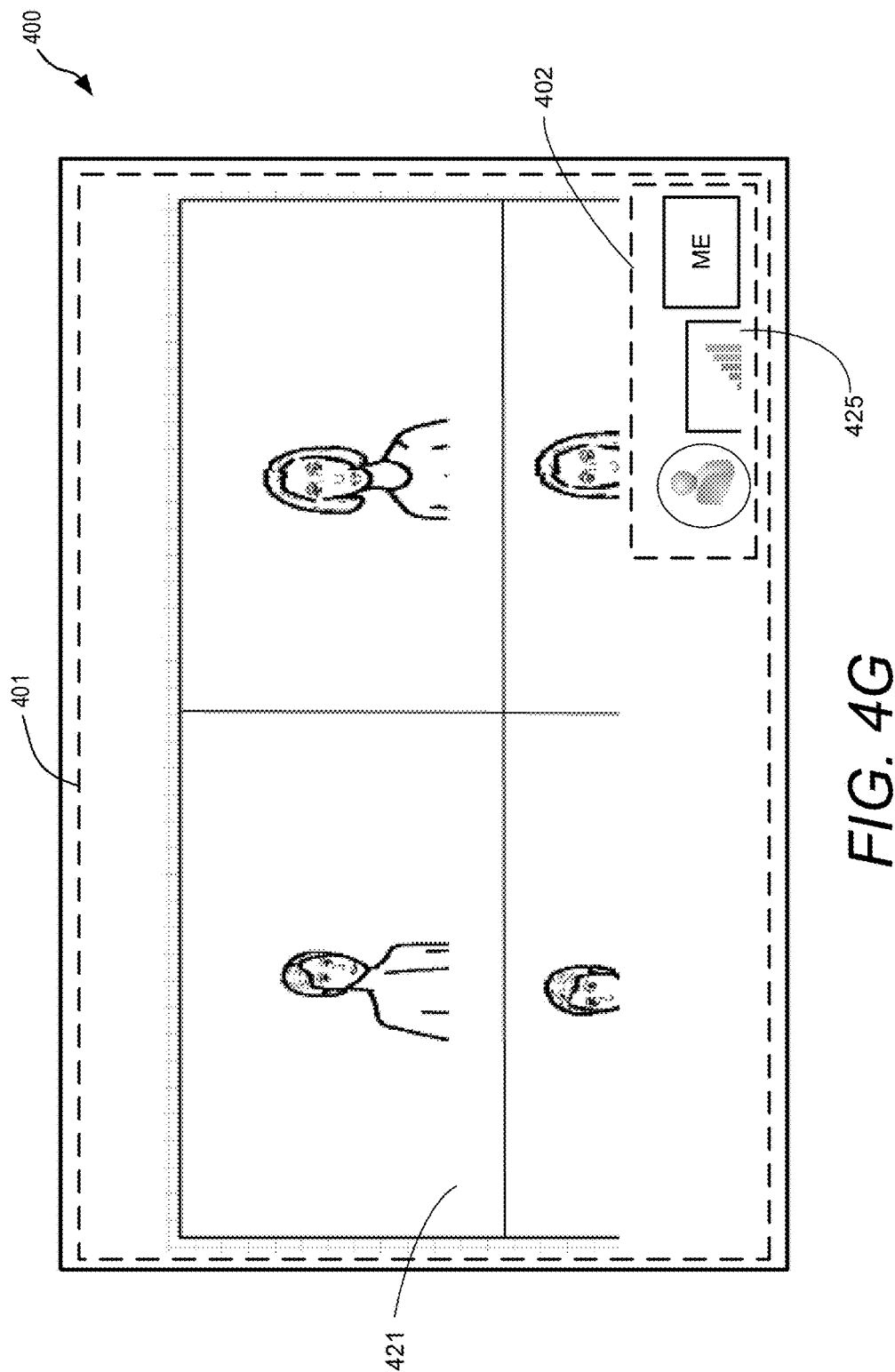

FIG. 4A illustrates one example of a representative UI 400 (also referred herein as a "teleconference session view 400" or an "overlay teleconference session view 400") comprising a first display area 401 and a second display area 402. In some configurations, the first display area 401 can be larger than the second display area 402. In some configurations, the second display area 402 can be overlaid over the first display area 401. In some configurations, the second display area 402 can fade after a predetermined period of time of user inactivity at the client computing device 106(1).

The first display area 401 can include a rendering of a first stream 425 of the teleconference data. For example, the first stream 425 of the teleconference data 146 can include an image of a shared document, which can be displayed on the first display area 401, e.g., a dominant section, of the UI 400. In this illustrative example, the shared document comprises a chart.

The second display area 402 can include a rendering of at least one stream 420 of the teleconference data 146. In some configurations, the at least one stream 420 can be a part of a plurality of streams of the teleconference data 146. In some configurations, the at least one stream 420 of the teleconference data 146 can be selected based on an activity level priority associated with the at least one stream 420.

For example, the at least one stream 420 can be a video stream of a person or content having the most dominant activity of a session. The at least one stream 420 can be the most active participant presenter, content having the most interaction with participant, or any other type of image or video of communicated media data associated with a high level of activity. The plurality of streams of the teleconference data 146 can be selected based on a level of activity. For example, individual streams of the plurality of streams can include video streams of participants or content having a threshold level of activity. In addition, the order or arrangement of the individual streams of the plurality of streams can be based on a level of activity associated with each stream. Aspects of such embodiments are described below in more detail and shown in FIG. 4H. FIG. 4A also shows a "ME" user interface element 411 having an image, an avatar, or a video of the user of the client computing device 106(1) on which the teleconference session is playing.

As described above, a transition of the teleconference session view 400 can be caused by a number of suitable actions. In response to receiving the control command, as shown in FIGS. 4A-4D, the system 102 can cause a rendering of the at least one stream 420 of the teleconference data to move from one display area of a UI to another display area of the UI. With reference to the above example, in response to receiving the control command, the at least one stream 420, can transition from the second display area 402 to the first display area 401.

The transition of the UI 400 can involve several coordinated animated movements to enable users to track the movement of people or content from one area of the UI to another. For instance, in response to receiving the control command, the rendering of the at least one stream 420 within the second display area 402 can begin to move toward the first display area 401. In some configurations, the movement of the rendering of the at least one stream 420 within the second display area 402 can involve an animation where the rendering of the at least one stream 420 appears to slide toward the first display area 401. For example, as shown in FIGS. 4A-4D, the rendering of the at least one stream 420 displayed within the second display area 402 can slide out of the second display area 402. The system 102 can move the rendering of the at least one stream 420 from a starting position (shown in FIG. 4A) to an ending position (shown in FIG. 4D) within the second display area 402. Alternatively, the system 102 can move the rendering of the at least one stream 420 from a starting position (shown in FIG. 4A) until the rendering of the at least one stream 420 slides out of the second display area 402.

The direction of movement of the rendering may be toward a centerline 455 (shown in FIG. 4D) of the first display area 401, the horizontal centerline 455 bisecting the top and bottom borders of the first display area 401. Alternatively, for instance, when the second display area is in another location, e.g., along a side of the first display area 401, the direction of movement of the rendering may be toward a vertical centerline of the first display area 401, the vertical centerline bisecting the sides of the first display area 401.

In association with the movement of the rendering of the at least one stream 420 within the second display area 402, as shown in FIGS. 4E-4H, the system 102 can also cause a rendering of the plurality of streams 421 within the first display area 401. In some configurations, the rendering of the plurality of streams 421 within the first display area 401 can involve an animation where the rendering of the plurality of streams 421 move in a predetermined direction. For example, the system 102 can move the rendering of the plurality of streams 421 from a first position (shown in FIG. 4E) toward a final position (shown in FIG. 4H) within the first display area 401. The movement of the rendering of the plurality of streams 421 within the first display area 401 can be in a vertical direction. In some configurations, the rendering of the plurality of streams 421 can appear to slide away from the second display area 402.

In some configurations, for illustrative purposes, teleconference data 146 can include a plurality of streams, which can include the least one stream 420 and a subset of the plurality of streams 421. The least one stream 420 and the subset of plurality of streams 421 can be selected and arranged based on an activity level.

The movement of the rendering of the at least one stream 420 within the second display area 402 and the movement of the rendering of the plurality of streams 421 within the first display area 401 are coordinated to bring focus to the transition of the activity depicted in the at least one stream 420 and the plurality of streams 421. Thus, the rendering, e.g., the display, of the selected streams, depicting activity above a threshold, can transition from one display area to another display area in a coordinated manner allowing a user to follow the movement and focus on activity of interest.

In some configurations, the rendering of the first stream 425, e.g., the chart, within the first display area 401 can fade prior to rendering of the plurality of streams 421 within the first display area 401. In some configurations, the rendering of the first stream 425 within the first display area 401 can fade as the rendering of the plurality of streams 421 moves from the first position toward the final position within the first display area 401. These examples are provided for illustrative purposes only and are not to be construed as limiting. The rendering of the first stream 425 within the first display area 401 can fade prior to or after the rendering of the plurality of streams 421 is displayed within the first display area 401.

In some configurations, in response to the control command, the content, e.g., the chart, displayed in the first display area 401 can be moved to the second display area 402. In such a transition, after the rendering of the first stream 425, e.g., the chart, has been removed from the first display area 401, the system 102 can render the first stream 425 in the second display area 402. The rendering of the first stream 425 can be introduced in a manner that deemphasizes the movement of such content. For instance, the chart displayed as a thumbnail, can slide in a particular direction to deemphasize the movement of such content.

In some configurations, the rendering of the first stream 425 in the second display area 402 moves from a starting position (FIG. 4E), the starting position showing at least a part of the rendering of the first stream 425, to a final position (FIG. 4H) within the second display area 402. In this example, the final position within the second display area 402 is positioned closer to the first display area 401 than the starting position, thus resulting in the rendering of the first stream 425 moving in a vertical direction, in this case, from the bottom of the UI toward the first display area 401.

In some configurations, the plurality of streams 421 can be arranged according to activity levels associated with individual streams of the plurality of streams 421. An example of such a configuration is shown in FIG. 4H. As shown a first individual stream 421A of the plurality of streams 421 is displayed in the upper left corner, a second individual stream 421B of the plurality of streams 421 is displayed in the upper right corner, and a third individual stream 421C of the plurality of streams 421 is displayed in the lower left corner, and a fourth individual stream 421D of the plurality of streams 421 is displayed in the lower right corner of the UI 400. Such an arrangement can be based on an activity level associated with the individual streams (421A-421D).

In some configurations, the renderings can be moved in a staggered manner. More specifically, individual streams of a plurality of streams in the first display area can move from a first position to a final position within the first display area in a staggered manner. In addition, individual streams of a plurality of streams in the second display area can move in a staggered manner. By moving renderings according to a staggered manner, further emphasis can be made with respect to salient activity that is moved from one section of a UI to another. FIGS. 5A-5K are screenshot views of a UI 300 showing one example of such coordination. The example shown in FIGS. 5A-5K involves a UI 300 arranged according to the persistent view described above. Although this example involves a persistent view, the techniques disclosed herein can move renderings in a staggered manner for any suitable user interface arrangement.

Figure 5A:
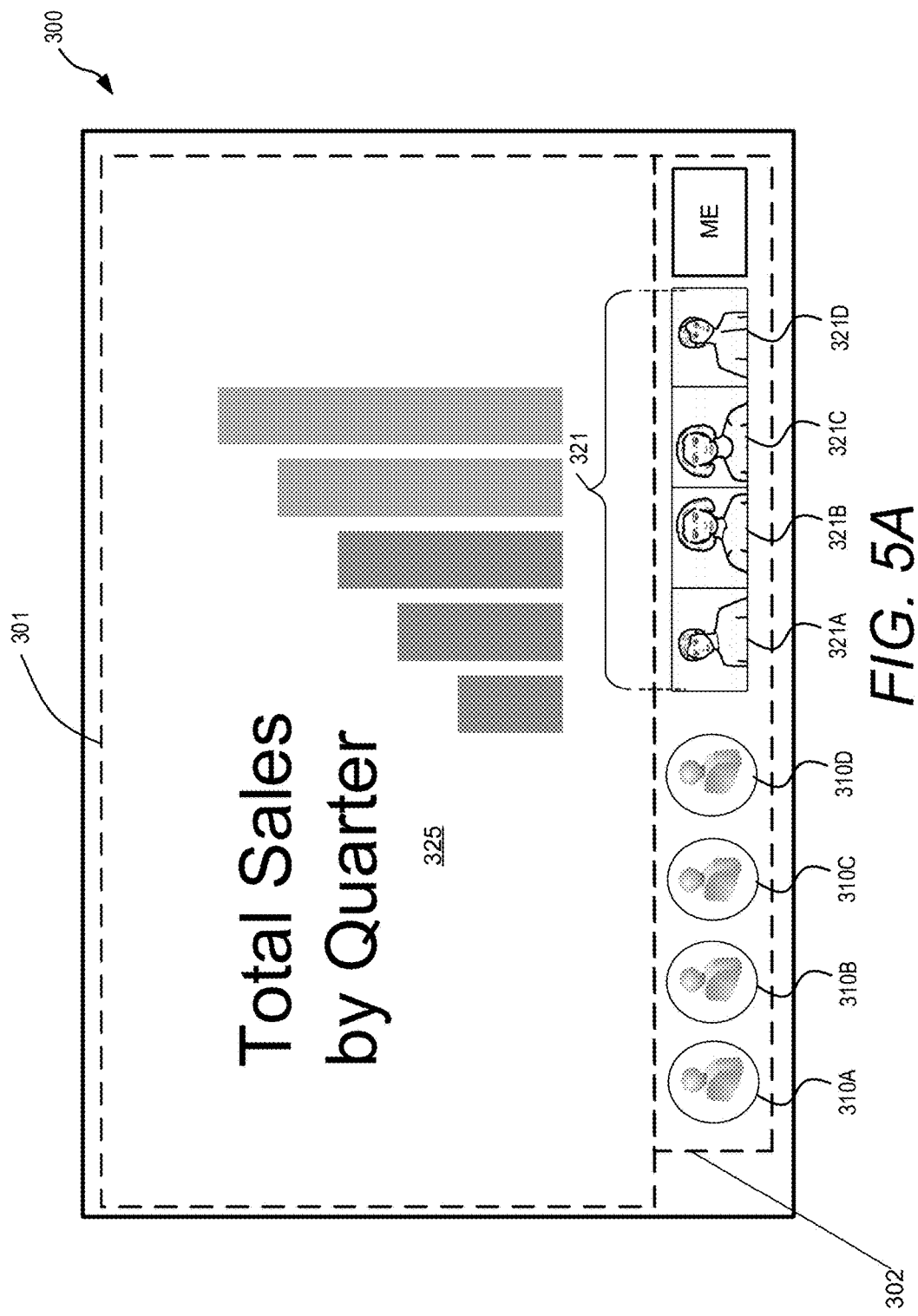
Figure 5E:
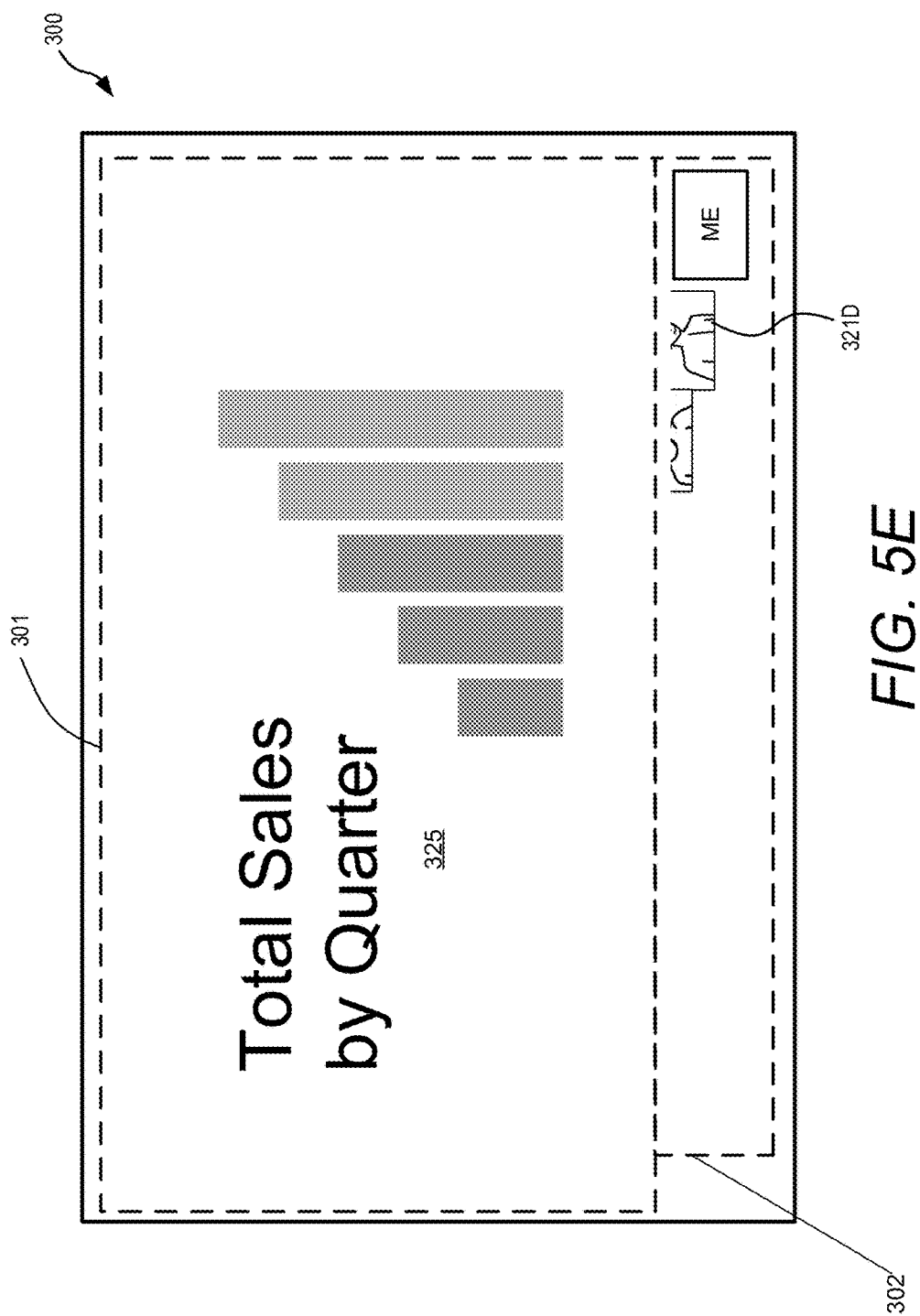

The UI 300 shown in FIG. 5A is similar to the UI 300 shown in FIG. 3A. The teleconference session view 300 comprises a first display area 301 and a second display area 302. In some configurations, the first display area 301 can be larger than the second display area 302. The first display area 301 can include a rendering of a first stream 325 of the teleconference data. For example, the first stream 325 of the teleconference data 146 can include an image of a document, which can be displayed on the first display area 301, e.g., a dominant section, of the UI 300. The second display area 302 can include a rendering of a group of streams 321 of the teleconference data 146, wherein the group of streams 321 comprises individual streams 321A-321D. For example, the individual streams 321A-321D of the group of streams 321 can include individual video streams or images of participants or content. FIG. 5A shows a "ME" user interface element 330 having an image, an avatar, or a video of the user of the client computing device 106(1) on which the teleconference session is being displayed.

In response to receiving a control command, the system 102 can cause the UI 300 to move the group of streams 321 within the second display area 302. In the example shown in FIG. 5A-5K, the individual streams 321A-321D can move in a staggered manner. As shown in FIG. 5A, the first stream 321A can start to move before the second stream 321B. As shown in FIG. 5B, the second stream 321B can move before the third stream 321C. As shown in FIG. 5C, the third stream 321C can move before the fourth stream 321D. As shown in FIG. 5D, the fourth stream 321*d* can begin to move after the movement of the third stream 321C.

Figure 5F:
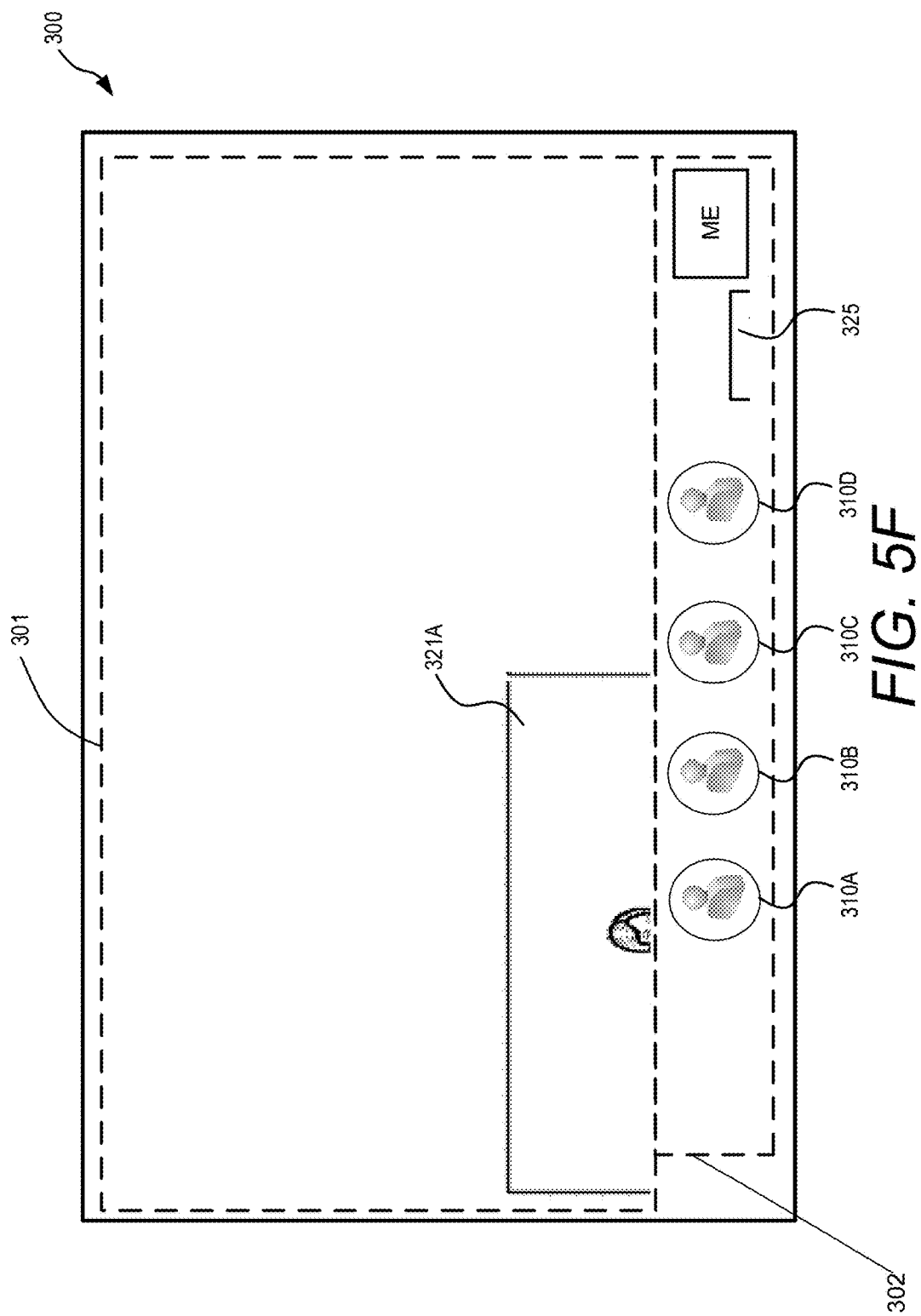
Figure 5H:
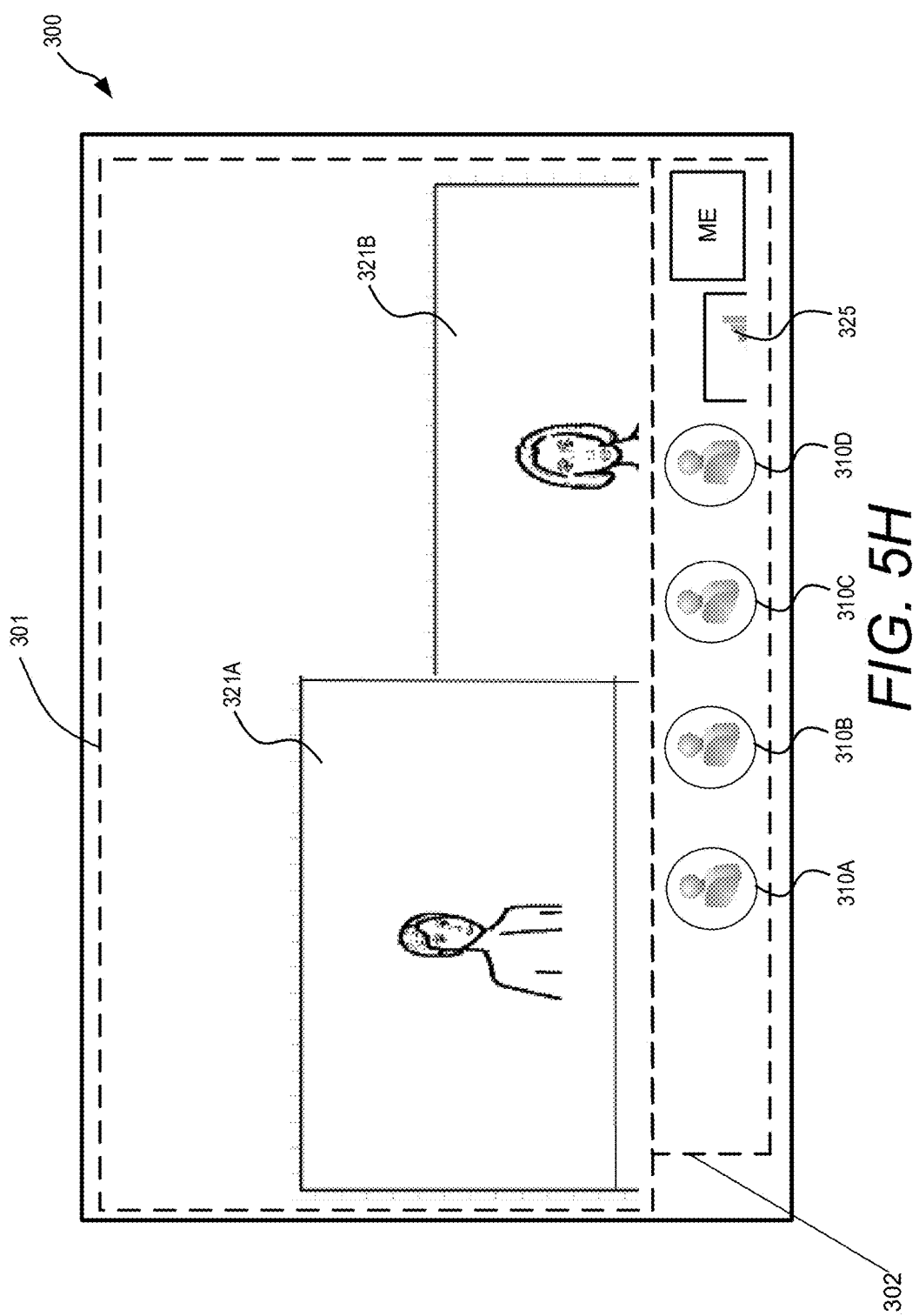

Then, as shown in FIG. 5F-5K, the individual streams 321A-321D can be rendered in the first display area 301. As shown, the individual streams 321A-321D can move in a staggered manner. In this illustrative example the individual streams 321A-321D rendered in the first display area 301 move according to the order in which the individual streams 321A-321D are moved from the second section 302. As shown in FIG. 5F, the first stream 321A is rendered and begins to move toward a final position. As shown in FIGS. 5G and 5H, the second stream 321B is rendered and begins to move toward a final position. In this example, the second stream 321B begins to move before the first stream 321A reaches its final position. As shown in FIG. 5I, the third stream 321C is rendered and begins to move towards a final position. In this example, the third stream 321C begins to move before the second stream 321B reaches its final position. As shown in FIG. 5J, the fourth stream 321D begins to the third stream 321C reaches its final position. In this example, the individual streams 321A-321D move in a predetermined direction until they individually reach a corresponding final position. FIG. 5K illustrates one example where the individual streams 321A-321D are in their corresponding final positions.

In some configurations, aspects of the present disclosure can involve the use of a parallax animation. In some configurations, a parallax animation can bring focus to renderings of one or more streams of the teleconference data as the renderings are moved from one section of a UI to another. The parallax animation brings focus to the movement of important activity thus enhancing the user experience promoting deeper participant engagement.

Figure 6B:
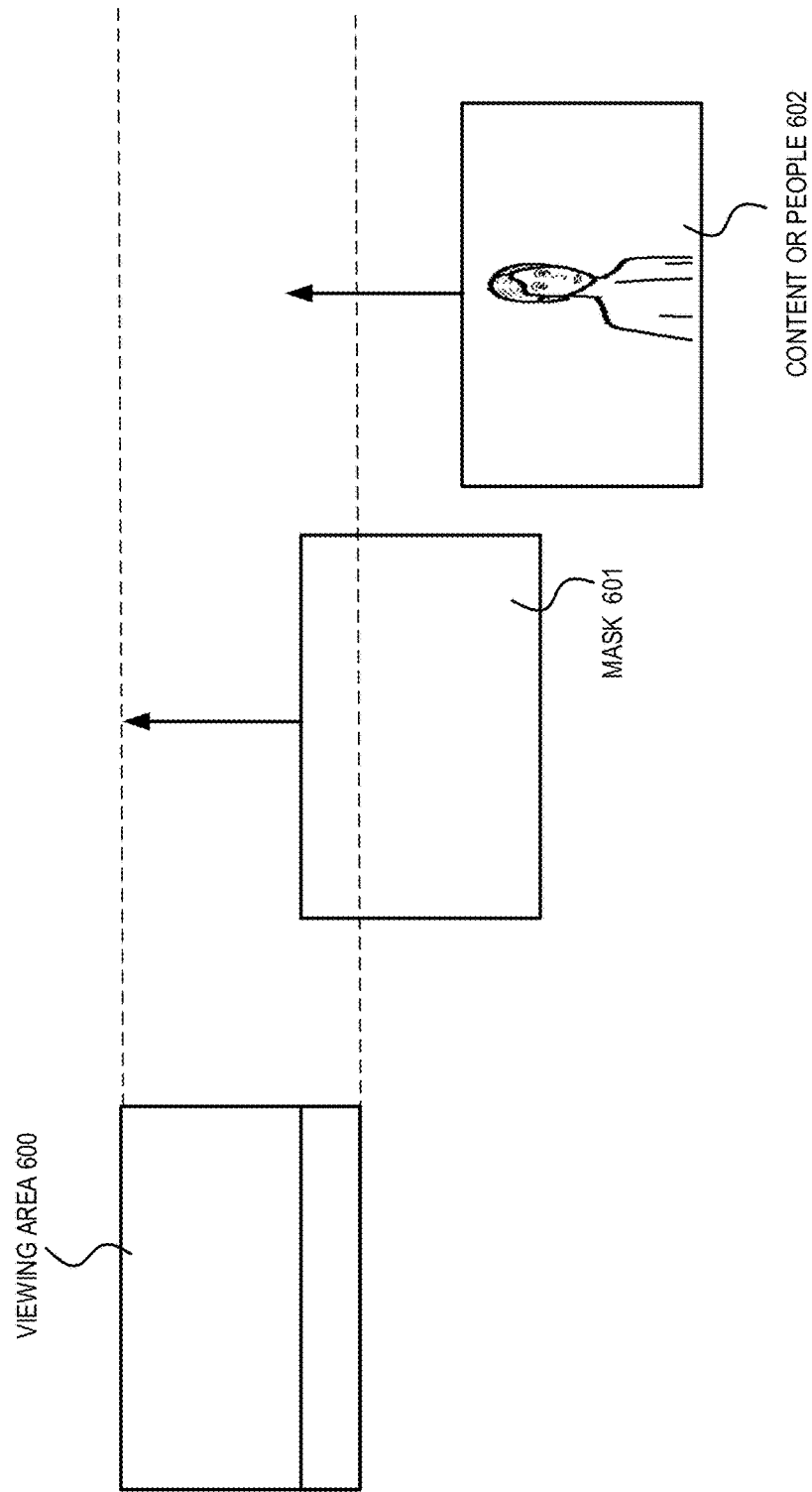

Aspects of one illustrative example of a parallax animation are shown in FIGS. 6A-6F. As shown in FIG. 6A, a parallax animation can result in a displayed rendering based on an alignment between a viewing area 600, a mask 601, and an image 602. In one illustrative example, the mask 601 can define a transparent region for exposing portions of the image 602. When a portion of the image 602 is aligned with the transparent region of the mask 601, that portion of the image 602 is displayed within the viewing area 600. Portions of the image 602 that are not aligned with the transparent region of the mask 601 are hidden, e.g., masked, from the viewing area 600. The movement of the mask 601 and the image 602 relative to the viewing area 600 can provide an augmented perspective of the image 602 when displayed on a device to a user.

In some configurations, the alignment between the viewing area 600, the mask 601, and the image 602, can be modified based on a movement of the mask 601 and the image 602 relative to the viewing area 600. The movement of the mask 601 and the image 602 can be in any predetermined direction such as a vertical direction, a horizontal direction, or a diagonal direction.

The mask 601 and the image 602 can move in different velocities to provide a controlled perspective of the image 602. FIGS. 6A-6F illustrate one example of a controlled perspective of the image 602. As shown in FIG. 6A, the mask 601 and the image 602 are not aligned with the viewing area 600. Thus, the viewing area 600 does not display any portion of the image 602. To illustrate aspects of a controlled perspective, the mask 601 is configured to move at a first velocity (v1) in a predetermined direction, and the image 602 is configured to move at a second velocity (v2) in a predetermined direction. Although this example involves both the mask 601 and the image 602 moving in the same direction, it can be appreciated that the mask 601 and the image 602 can move in independent directions to produce a desired perspective.

Figure 6C:
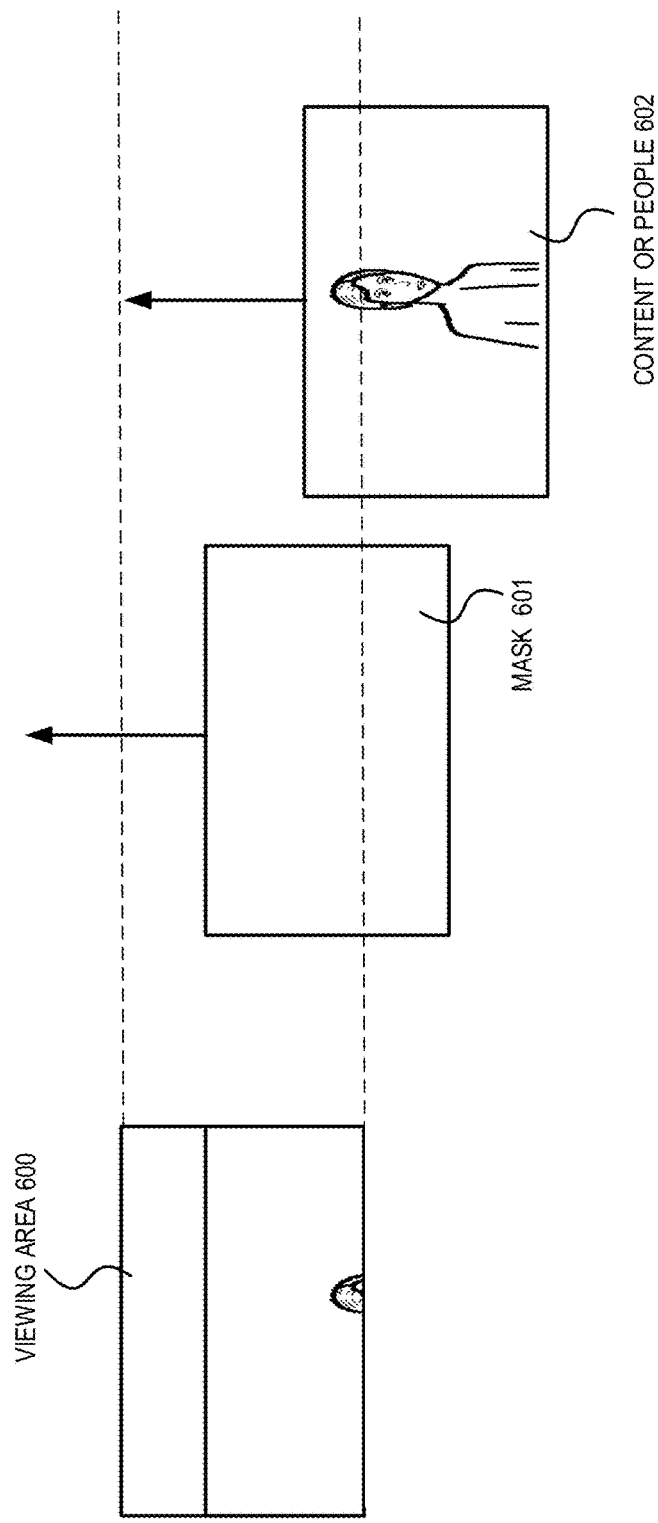
Figure 6D:
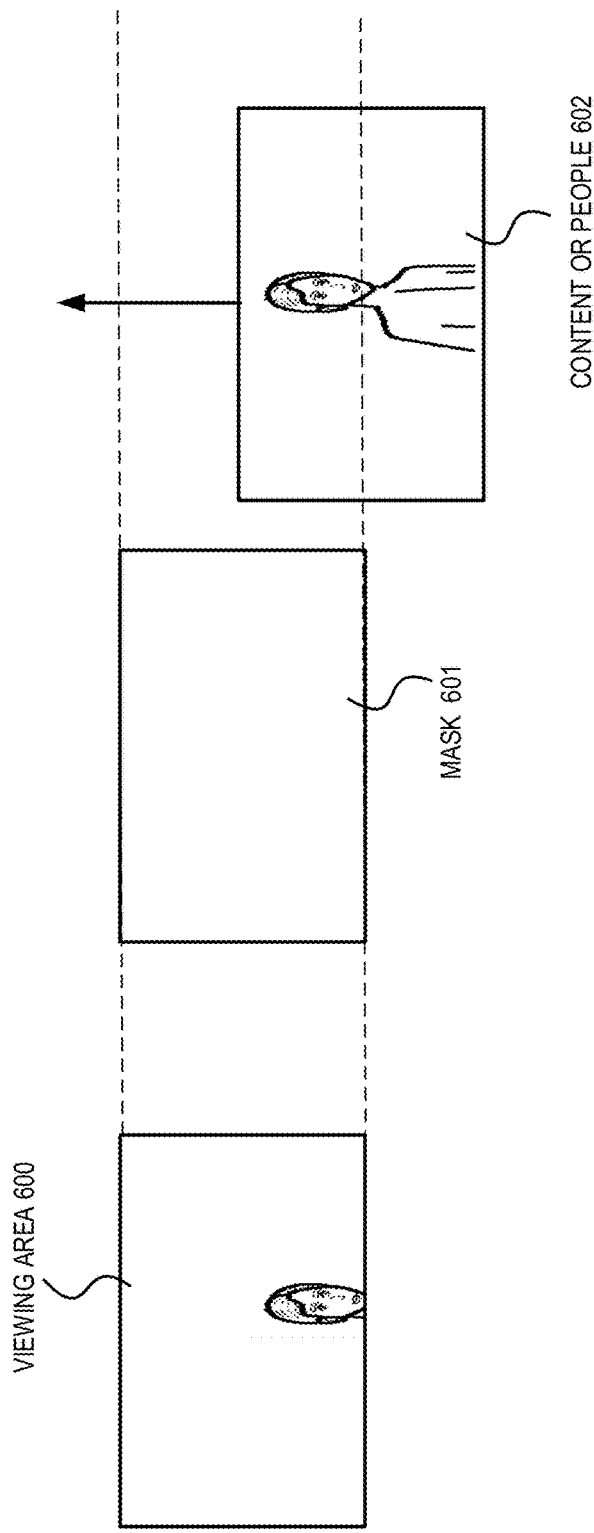
Figure 6E:
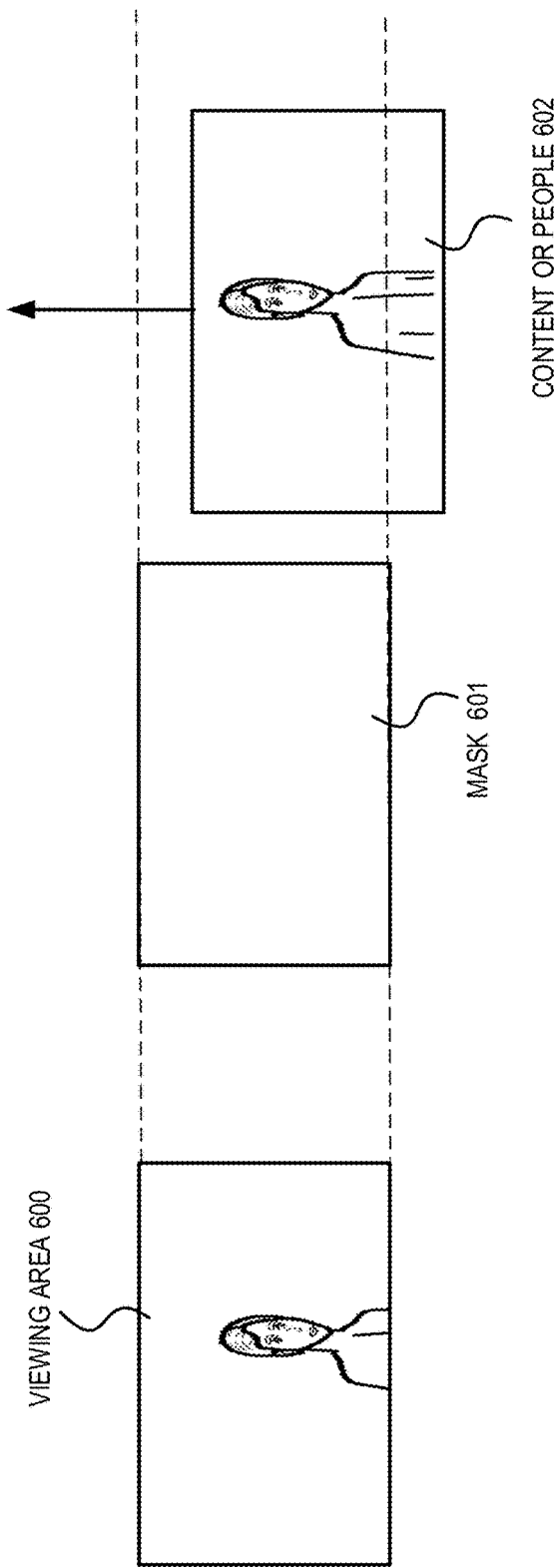

As shown in FIG. 6B, as the mask 601 aligns with the viewing area 600, an outline of the mask 601 is displayed within the viewing area 600. As shown in FIG. 6C, as the mask 601 and the image 602 are aligned with the viewing area, the portion of the image 602 that aligns with the transparent area of the mask 601 is displayed within the viewing area 600. Also shown in FIG. 6C, the outline of the mask 601 has moved with the position of the mask 601, thus providing a modified perspective of the image 602. As shown in FIGS. 6D and 6E, as the mask 601 and the image 602 move in an upward direction, the transparent area of the mask 601 exposes additional portions of the image 602.

Figure 6F:
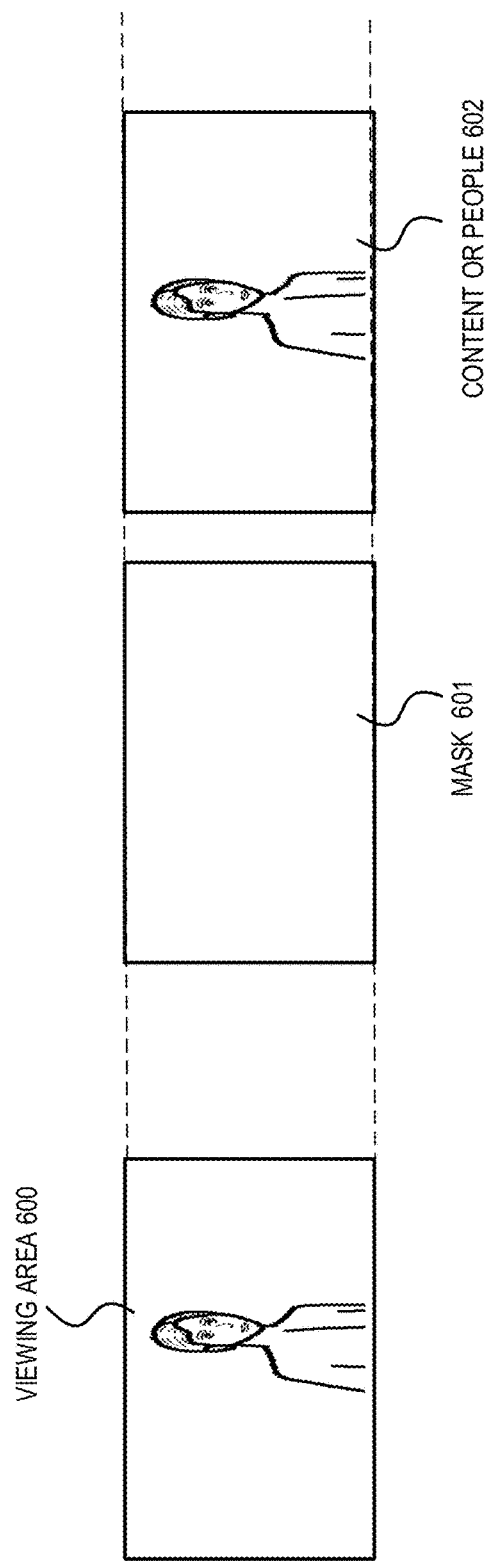

Then, as shown in FIG. 6F, when the viewing area 600, the mask 601 and the image 602 are fully aligned, the image 602 is fully displayed within the viewing area 600.

In addition to moving the mask 601 and the image 602 at different velocities, a modified perspective of the image 602 can also be provided by modifying display properties with respect to the image 602 over time. For instance, in the above example, as the image 602 moves at a predetermined velocity, the brightness, color, scale or any other display property of the image 602 can be modified. Other effects, such as a blurring effect, can be modified as the mask 601 and/or the image 602 moves relative to the viewing area 600. Such modifications can provide a modified perspective for bringing focus to the contents of the image 602.

As summarized above, these effects can be applied to any rendering of one or more streams of the teleconference data to bring focus to salient content or people as the renderings are moved from one section, e.g., the second display area 302, of a UI to another section, e.g., the first display area 301, of the UI.

In some embodiments, the velocity of the throwing motion and the catching motion can be configured to bring focus to the movement of salient activity. For example, the velocity of the throwing motion and the catching motion can be constant during a motion. In another example, the velocity of the of the throwing motion and the catching motion can be based on an easing curve. As will be described in more detail below, an easing curve involves an exponential increase in the velocity of the throwing motion, and an exponential decrease of the velocity of the catching motion.

Figure 7:
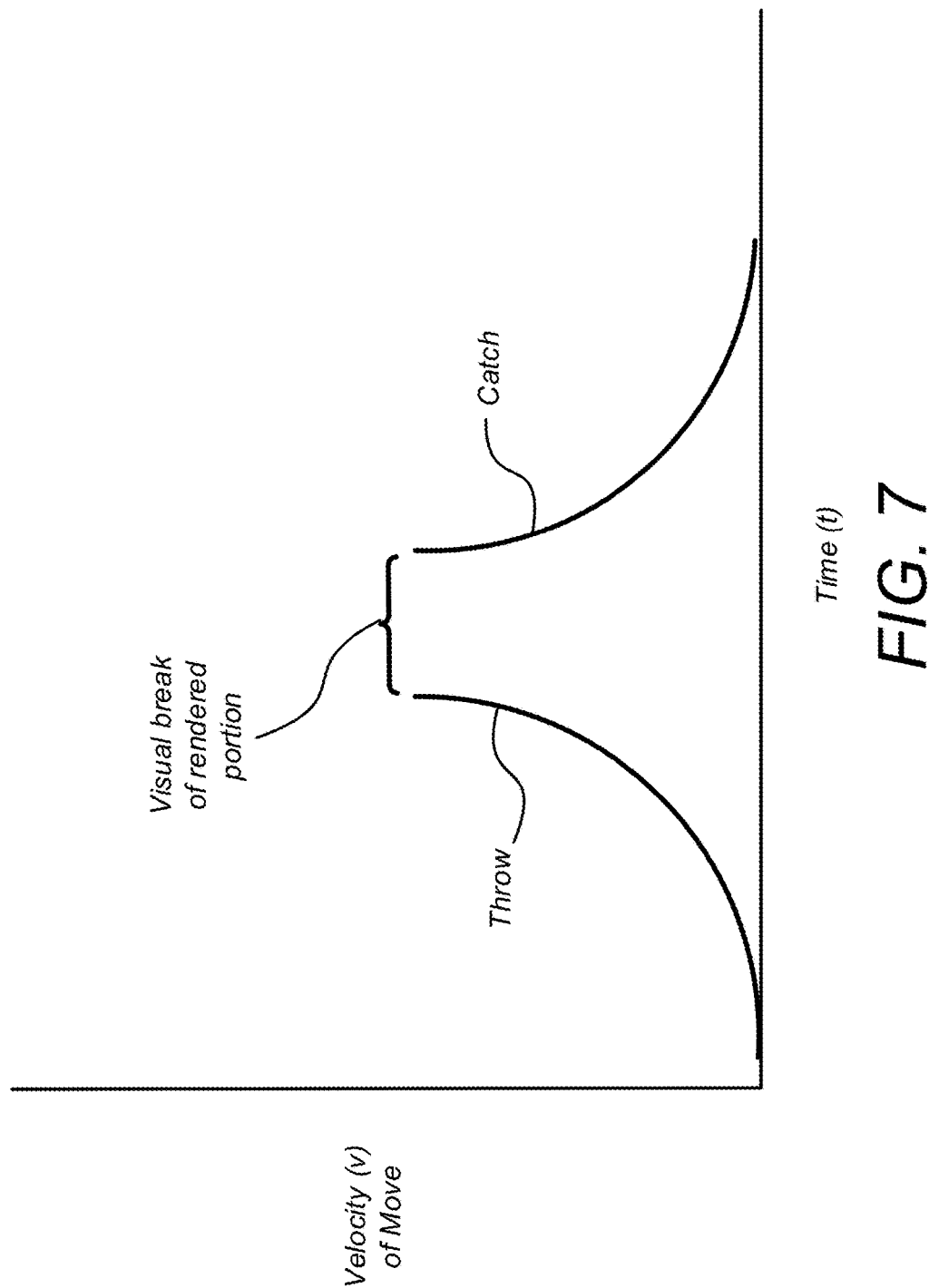
FIG. 7 illustrates one example of an easing curve that can be applied to the techniques disclosed herein.

FIG. 7 illustrates one example of an easing curve that can be applied to the techniques disclosed herein. FIG. 7 shows a velocity of a movement that can be applied to a rendering of one or more streams over time. In this illustrative example, this chart shows the throwing motion and a catching motion. In addition, this chart also shows a period of time when the rendering is not displayed, e.g., there is a visual break in the rendering of a stream that is moved between display areas of a UI. For instance, the UI 300 in the above example, may not display the stream for a predetermined time between the throwing motion displayed in the second display area and the catching motion displayed in the first display area.

The movements applied to the individual renderings can follow a pattern of acceleration expressed in this chart. In some configurations, a movement can accelerate exponentially during a throwing motion. For example, in FIG. 3A, when the rendering of the second stream moves within the second display area it can accelerate exponentially before the system causes a visual break in the rendering of the second stream. In some configurations, a movement within the first display area can decelerate exponentially during a catching motion. For example, as the rendering of the secondary stream approaches the final position shown in FIG. 3I, the movement of the rendering can decelerate exponentially. This example is provided for illustrative purposes only and is not to be construed as limiting. It can be appreciated that the velocity of a movement can follow any particular pattern, which can include a constant velocity or any other variation of a velocity, to bring focus to renderings that are moved between sections of a UI.

It should be appreciated that many variations and modifications can be made to the examples described herein, the elements of which are to be understood as being among other acceptable examples. All such modifications and variations are intended to be included herein within the scope of this disclosure and protected by the following claims. For instance, although the above-described examples involve two-dimensional user interfaces, the techniques disclosed herein can also involve user interfaces of other dimensions, including three-dimensional user interfaces. Thus, in a three-dimensional virtual environment, a rendered three-dimensional object may move between a first three-dimensional area to a second three-dimensional area utilizing the coordinated movements described herein. In such embodiments, the three-dimensional object can appear to slide within the first three-dimensional area toward the second three-dimensional area. In addition, the three-dimensional object can appear to slide within the second three-dimensional area, appearing to move away from the first three-dimensional area. Other techniques described herein, such as those involving the easing curve, may be utilized in such embodiments.

The renderings that are moved from one display area to another display area can represent any suitable computing function performed by a computer or machine. For instance, in addition to the examples described herein, a rendering moved from one display area to another display area can represent the transfer of data between a first computer and a second computer. In such embodiments, a rendering may represent the contents of a file. When the file is transferred from the first computer to a second computer, the rendering can move, using one or more animation techniques, within a first display area toward a second display area. In addition, the rendering can be displayed, at least partially, within the second display area. The rendering can also move, using one or more animation techniques, within the second display area appearing to move away from the first display area. Other techniques described herein, such as those involving the easing curve, may be utilized in such embodiments.

Figure 8:
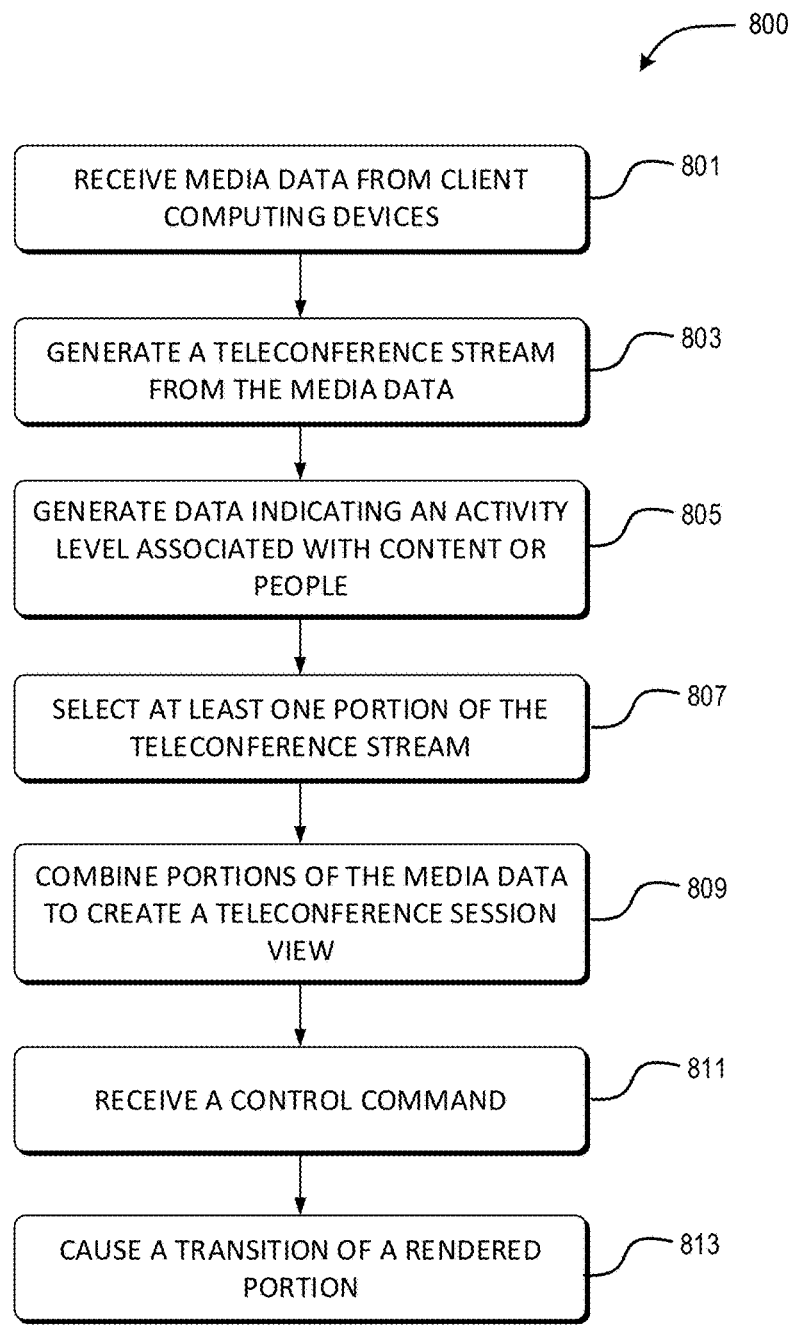
FIG. 8 is a flow diagram showing aspects of a routine for enabling transition events of people and content promotion in teleconference sessions.

Turning now to FIG. 8, aspects of a routine 800 for causing a transition of a view are shown and described below. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 800 are described herein as being implemented, at least in part, by an application, module, component, circuit, and/or an operating system (128 or 226), which are individually or collectively referred to herein as one or more modules of a system. In some configurations, the application or another module running the features disclosed herein can be a dynamically linked library (DLL), a statically linked library, functionality produced by an application programming interface (API), a compiled program, an interpreted program, a script or any other executable set of instructions. Data, such as data indicating an input signal, and the application can be stored in a data structure in one or more memory components. Data can be retrieved from the data structure by addressing links or references to the data structure.

Although the following illustration refers to the components of FIG. 1 and FIG. 2, it can be appreciated that the operations of the routine 800 may be also implemented in many other ways. For example, the routine 800 may be implemented, at least in part, by a processor of another remote computer or a local circuit. In addition, one or more of the operations of the routine 800 may alternatively or additionally be implemented, at least in part, by a chipset working alone or in conjunction with other software modules. Any service, circuit or application suitable for providing the techniques disclosed herein can be used in operations described herein.

With reference to FIG. 8, the routine 800 begins at operation 801, where one or more modules receives media data from a plurality of client computing devices. As summarized above, media data can comprise video data of a participant, image data representing a participant, content data, etc. Next, at operation, 803, one or more modules can generate a teleconference data comprising streams of the media data. In some configurations, the media data are combined by the server to generate teleconference data defining aspects of a teleconference session. The teleconference data can comprise individual data streams, also referred to herein as "streams," which can comprise content streams or participant streams. The participant streams include video of one or more participants. The content streams may include video or images of files, data structures, word processing documents, formatted documents (e.g. PDF documents), spreadsheets, or presentations. The content streams include all streams that are not participant streams. In some configurations, the participant streams can include video data, and in some configurations audio data, streaming live from a video camera connected to the participant's client computing device. In some instances, a participant may not have access to a video camera and may communicate a participant stream comprising an image of the participant, or an image representative of the participant, such as, for example, an avatar. The teleconference data and/or the streams of the teleconference data can be configured to cause a computing device to generate a user interface comprising a first display area for rendering one or more streams and a second display area for rendering other streams.

Next, at operation 805, the one or more modules can generate data indicating an activity level associated with individual streams of the teleconference data. As described herein, a number of factors can be used to determine an activity level associated with individual streams, including but not limited to user, e.g., participant, activity, activity associated with content, etc.

Next, at operation 807, the one or more modules can select at least one stream of the teleconference data from a plurality of streams of the teleconference data. In some configurations, the selection is based on an activity level associated with the at least one stream. For example, if a stream of the teleconference data is a video stream of a participant and that participant has activity above a threshold, that participant may be selected.

Next, at operation 809, the one or more modules can combine streams of the media data into the teleconference data according to a selected teleconference session view corresponding to a selected client computing device having a display device. In some configurations, the one or more modules can transmit the teleconference data to selected client computing devices to display the teleconference data according to the selected teleconference session view. The display device can display the selected teleconference session view. The selected teleconference session view includes a first display area displaying a rendering of a first stream of the teleconference data and a second display area for displaying a rendering of the at least one stream, the selected stream, of the teleconference data. For example, the first stream can include display data for a content file and the at least one stream can include a person or a group of people, as shown in FIG. 3A and FIG. 4A.

Next, at operation 811, the one or more modules can receive a control command for causing a transition of the rendering of the at least one stream. In some configurations, the transition of the teleconference session view 300 can be caused by a number of suitable actions. For instance, the system 102 can receive a control command for causing a transition of the teleconference session view. The control command, for example, can be invoked by a computer or invoked by a user. The source of the control command can include, but is not limited to, receiving a user input, receiving a user voice command, receiving a command issued by a remote computer, etc. In one specific example, the second display area 302 can be configured with a selectable user element. The selectable user element can be arranged for instance, around the rendering of the second stream or the at least one stream. Thus, a transition can be initiated when the user selects the rendering of the second stream or the at least one stream.

Next, at operation 813, in response to receiving the control command, the one or more modules can cause a transition of a rendered stream from a first display area of a UI to a second display area of the UI. In some configurations, a transition can include causing the rendering of the at least one stream to move within the second display area by the use of an animation toward the first display area. The movement of the rendering of the at least one stream within the second display area can involve an animation where the rendering of the at least one stream appears to slide toward the first display area.

In association with the movement of the rendering of the at least one stream within the second display area, the one or more modules can cause a rendering of the plurality of streams in the first display area to appear in the first display area. In some configurations, the one or more modules can cause a rendering of the plurality of streams to move from a first position to a final position within the first display area. The movement of the rendering of the plurality of streams within the first display area can involve an animation where the rendering of the plurality of streams appears to slide in a predetermined direction.

Although the techniques have been described in language specific to structural features and/or methodological acts, it is to be understood that the appended claims are not necessarily limited to the features or acts described. Rather, the features and acts are described as example implementations of such techniques.

The operations of the example processes are illustrated in individual blocks and summarized with reference to those blocks. The processes are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations. Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external CPUs or GPUs, and/or one or more pieces of hardware logic such as FPGAs, DSPs, or other types of accelerators.

All of the methods and processes described above may be embodied in, and fully automated via, software code modules executed by one or more general purpose computers or processors. The code modules may be stored in any type of computer-readable storage medium or other computer storage device. Some or all of the methods may alternatively be embodied in specialized computer hardware.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

Any routine descriptions, elements or blocks in the flow diagrams described herein and/or depicted in the attached figures should be understood as potentially representing modules, segments, or streams of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art. It should be emphasized that many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
one or more processing units; and
a computer-readable medium having encoded thereon computer-executable instructions to cause the one or more processing units to
receive teleconference data comprising a plurality of streams associated with a teleconference session;
cause the teleconference data to be displayed in a user interface comprising
a first display area comprising a rendering of a first stream of the plurality of streams, and
a second display area comprising a rendering of a second stream of the plurality of streams, wherein the second stream is selected based on an activity level associated with the second stream;
receive a control command for causing a transition of the rendering of the second stream; and
in response to receiving the control command,
cause the rendering of the second stream to move within the second display area toward the first display area,
in association with the movement of the rendering of the second stream within the second display area, cause a rendering of the second stream within the first display area, wherein the rendering of the second stream within the first display area moves from a first position to a final position within the first display area, wherein the movement of the rendering of the second stream within the second display area and the movement of the rendering of the second stream within the first display area are coordinated to bring focus to the transition of the second stream, and
cause a rendering of the first stream in the second display area, wherein the rendering of the first stream in the second display area replaces the rendering of the second stream within the second display area, wherein the rendering of the first stream in the second display area moves from a starting position, the starting position showing at least a part of the rendering of the first stream, to a final position within the second display area, wherein the final position within the second display area is positioned closer to the first display area than the starting position.

2. The system of claim 1, wherein the rendering of the second stream within the first display area moves away from the second display area toward the final position, wherein the rendering of the first stream within the first display area fades prior to moving the rendering of the second stream from the first position toward the final position.

3. The system of claim 1, wherein the movement of the rendering of the second stream within the first display area begins as the rendering of the second stream within the second display area fades.

4. The system of claim 1, wherein the user interface further comprises a rendering of a plurality of passive elements at a starting position, in association with the movement of the rendering of the second stream within the second display area, causing the rendering of the plurality of passive elements to move from the starting position to a landing position, wherein a spacing between individual passive elements of the plurality of passive elements expands as the plurality of passive elements to begin to move from the starting position, and wherein the spacing between individual passive elements contracts as the plurality of passive elements approach the landing position.

5. The system of claim 1, wherein the movement of the rendering of the second stream within the first display area comprises a parallax animation.

6. The system of claim 1, wherein a velocity of the rendering of the second stream increases exponentially as the rendering moves within the second display area toward the first display area, and wherein the velocity of the rendering of the second stream decreases exponentially within the first display area as the rendering of the second stream approaches the final position.

7. A system comprising:
one or more processing units; and
a computer-readable medium having encoded thereon computer-executable instructions to cause the one or more processing units to
receive a teleconference data comprising a plurality of streams, individual streams of the plurality of streams comprising media data provided by one or more computing devices;
receive data indicating a selection of at least one stream of the plurality of streams, wherein the selection is based on an activity level priority associated with the at least one stream;
cause the teleconference data to be displayed in a user interface comprising
a first display area comprising a rendering of a first stream of the plurality of streams, and
a second display area comprising a rendering of the at least one stream of the plurality of streams;
receive a control command for causing a transition of the rendering of the at least one stream; and
in response to receiving the control command,
cause the rendering of the at least one stream to move within the second display area toward the first display area,
in association with the movement of the rendering of the at least one stream within the second display area, cause a rendering of a subset of the plurality of streams in the first display area to move from a first position to a final position within the first display area, wherein individual streams of the subset of the plurality of streams are arranged according to an activity level associated the individual streams, and
cause a rendering of the first stream in the second display area, wherein the rendering of the first stream in the second display area replaces the rendering of the second stream within the second display area, wherein the rendering of the first stream in the second display area moves from a starting position, the starting position showing at least a part of the rendering of the first stream, to a final position within the second display area, wherein the final position within the second display area is positioned closer to the first display area than the starting position.

8. The system of claim 7, wherein the rendering of the plurality of streams within the first display area moves away from the second display area toward the final position, wherein the rendering of the first stream within the first display area fades prior to moving the rendering of the plurality of streams from the first position toward the final position.

9. The system of claim 8, wherein the movement of the rendering of the subset of the plurality of streams within the first display area begins as the rendering of the at least one stream within the second display area fades.

10. The system of claim 7, wherein the subset of the plurality of streams in the first display area move from a first position to a final position within the first display area in a staggered arrangement.

11. The system of claim 1, wherein the movement of the rendering of the first stream of the teleconference data in the second display area comprises a parallax animation.

12. A method, comprising:
generating a teleconference data comprising a plurality of streams;
communicating the plurality of streams to a client computing device having a display device for displaying a user interface comprising a first display area displaying a rendering of a first stream of the plurality of streams and a second display area for displaying a rendering of a second stream of the plurality of streams;
receiving a control command for causing a transition of the rendering of the at least one stream; and
in response to receiving the control command,
cause the rendering of the second stream to move within the second display area toward the first display area, wherein the movement of the rendering of the second stream within the second display area comprises an animation where the rendering of the second stream within the second display appears to slide toward the first display area,
in association with the movement of the rendering of the second stream within the second display area, cause a rendering of the second stream within the first display area, wherein the rendering of the second stream within the first display area comprises an animation where the rendering of the second stream appears to slide away from the second display area to a final position within the first display area, wherein a velocity of the rendering of the second stream increases exponentially as the rendering moves within the second display area toward the first display area, and wherein the velocity of the rendering of the second stream decreases exponentially within the first display area as the rendering of the second stream approaches the final position.

13. The method of claim 12, further comprising, causing a rendering of the first stream in the second display area in response to receiving the control command, wherein the rendering of the first stream in the second display area replaces the rendering of the second stream in the second display area.

14. The method of claim 12, wherein the rendering of the second stream appears to slide toward the final position within the first display area after the rendering of the second stream appears to slide out of the second display area.

15. The method of claim 12, wherein the movement of the rendering of the second stream within the first display area comprises a parallax animation, wherein the parallax animation comprises filtering the rendering of the second stream by the use of a mask having a transparent region for exposing portions of the rendering of the second stream that are in alignment with the transparent region, wherein the movement of the rendering of the second stream within the first display area moves at a first velocity and the mask moves the alignment of the transparent region at a second velocity.

* * * * *